United States Patent
Yamazaki et al.

(10) Patent No.: US 8,624,548 B2
(45) Date of Patent: Jan. 7, 2014

(54) MOVING OBJECT, WIRELESS POWER FEEDING SYSTEM, AND WIRELESS POWER FEEDING METHOD

(75) Inventors: Shunpei Yamazaki, Tokyo (JP); Jun Koyama, Kanagawa (JP); Yutaka Shionoiri, Kanagawa (JP)

(73) Assignee: Semiconductor Energy Laboratory Co., Ltd. (JP)

( * ) Notice: Subject to any disclaimer, the term of this patent is extended or adjusted under 35 U.S.C. 154(b) by 288 days.

(21) Appl. No.: 13/018,791

(22) Filed: Feb. 1, 2011

(65) Prior Publication Data

US 2011/0193520 A1 Aug. 11, 2011

(30) Foreign Application Priority Data

Feb. 5, 2010 (JP) ................. 2010-023706

(51) Int. Cl.
*H02J 7/02* (2006.01)
*H02J 7/00* (2006.01)

(52) U.S. Cl.
USPC .......................... 320/108; 320/109

(58) Field of Classification Search
USPC ....................................... 320/108
See application file for complete search history.

(56) References Cited

U.S. PATENT DOCUMENTS

| | | | |
|---|---|---|---|
| 4,560,916 A | 12/1985 | Yoshiyuki et al. | |
| 5,524,044 A | 6/1996 | Takeda | |
| 5,654,621 A | 8/1997 | Seelig | |
| 6,026,921 A | 2/2000 | Aoyama et al. | |
| 6,157,162 A | 12/2000 | Hayashi et al. | |
| 6,837,438 B1 | 1/2005 | Takasugi et al. | |
| 7,674,650 B2 | 3/2010 | Akimoto et al. | |
| 7,737,658 B2 | 6/2010 | Sennami et al. | |
| 8,030,888 B2 | 10/2011 | Pandya et al. | |
| 2002/0055345 A1* | 5/2002 | Wood, Jr. ................ | 455/277.1 |
| 2002/0157881 A1 | 10/2002 | Bakholdin et al. | |
| 2005/0254183 A1 | 11/2005 | Ishida et al. | |
| 2006/0022636 A1 | 2/2006 | Xian et al. | |
| 2007/0216348 A1 | 9/2007 | Shionoiri et al. | |
| 2008/0056402 A1 | 3/2008 | Jang et al. | |
| 2008/0210762 A1 | 9/2008 | Osada et al. | |
| 2010/0099432 A1* | 4/2010 | Glover et al. ............. | 455/456.1 |
| 2010/0289331 A1 | 11/2010 | Shionoiri et al. | |
| 2011/0014880 A1* | 1/2011 | Nicolson et al. ................ | 455/86 |

FOREIGN PATENT DOCUMENTS

| | | |
|---|---|---|
| JP | 8-237890 | 9/1996 |
| JP | 2004-229425 | 8/2004 |
| JP | 2005-210843 | 8/2005 |

* cited by examiner

*Primary Examiner* — M'Baye Diao
(74) *Attorney, Agent, or Firm* — Husch Blackwell LLP

(57) ABSTRACT

An object is to provide a moving object structure capable of reducing power loss caused when power is supplied from a power feeding device to a moving object by wireless communication. Another object is to provide a moving object structure capable of reducing the strength of a radio wave radiated to the surroundings. Before power is supplied to a moving object, a radio wave for alignment of antennas is output from a power feeding device. That is, radio waves are output from a power feeding device in two stages. In a first stage, a radio wave is output to align positions of antennas of the power feeding device and the moving object. In a second stage, a radio wave is output to supply power from the power feeding device to the moving object.

27 Claims, 15 Drawing Sheets

410

411    413    412

MOVING OBJECT, WIRELESS POWER FEEDING SYSTEM, AND WIRELESS POWER FEEDING METHOD

BACKGROUND OF THE INVENTION

1. Field of the Invention

The present invention relates to a moving object which is driven by an electric motor and includes a secondary battery chargeable by wireless communication. The present invention also relates to a wireless power feeding system including a moving object and a power feeding device which supplies power to the moving object through wireless communication. The present invention further relates to a wireless communication method for use in the wireless power feeding system.

2. Description of the Related Art

In recent years, energy saving, creation and storage technologies are attracting more attention because environmental problems such as global warming are becoming more severe. In the case of a moving object with a secondary battery, i.e., a moving object which is driven by an electric motor using power provided from a secondary battery, including but not limited to a two-wheeled vehicle or a four-wheeled vehicle such as a bicycle having a motor and an electric car, energy storage techniques are used and in addition, an amount of carbon dioxide emissions can be reduced. Therefore, techniques used for such a moving object are being developed actively.

At present, the secondary battery of the moving object can be charged by using a general home AC power source as a power feeding device or by using a public power feeding facility having a power feeding device such as a high-speed battery charger. In either case, a connector which makes electric connection by insertion of a plug into a socket is commonly used.

For charging of a secondary battery using such connection with the use of a connector, an electric connection between a moving object and a power feeding device is made by bringing a conductor of a plug into contact with a conductor of a socket. This requires plugging-in/out operations for every charging, which may deteriorate the connector due to repeated charging operations. In addition, a large-sized moving object such as an electric car requires high power for charging. This may raise safety issues since damage from an electric shock or a short circuit due to moisture or the like may be significant. Accordingly, special care is needed for handling the connector in the moving object.

In order to avoid the above problems associated with a connector, research and development are being conducted to propose a wireless power feeding system for supplying power from a power feeding device to a moving object by wireless communication (for example, see Patent Document 1). Use of such a wireless power feeding system allows a secondary battery to be charged without using any connector.

REFERENCE

[Patent Document 1] Japanese Published Patent Application No. 2004-229425

SUMMARY OF THE INVENTION

In the above-described wireless power feeding system, a radio wave transmitted from an antenna of the power feeding device is received by an antenna of the moving object. The received radio wave is converted into electric energy, which is then stored in the secondary battery. The efficiency of converting energy of the radio wave into electric energy depends on a positional relationship between the antenna of the power feeding device and the antenna of the moving feeding device. That is, misalignment between the positions of the power feeding device and the antenna of the moving object leads to a low conversion efficiency, which results in inefficient charging of the secondary battery. However, it is difficult in most instances for a driver of the moving object to recognize the positional relationship between the antennas of the moving object and the power feeding device while driving the moving object, although it depends on where the antennas are installed.

In addition, in many cases, the antenna of the power feeding device outputs a substantially constant high power radio wave. Thus, if the conversion efficiency for charging is low due to misalignment between the antennas, power may be dissipated and a high power radio wave which has not been converted into electric energy may be radiated to the surroundings. Although it is known that irradiation of the radiated radio wave on a living body such as a human body causes no problem since most of the radiated radio wave is absorbed into the body and is changed into heat, an effect of a radio wave on a living body has not yet been completely explained. Therefore, it is desirable to reduce the strength of the radio wave radiated to the surroundings.

In consideration of the above problems, an object of the present invention is to provide a structure of a moving body which enables reduction of power loss caused when power is supplied from a power feeding device to a moving object by wireless communication. Another object of the present invention is to provide a structure of a moving body which enables reduction of the strength of a radio wave radiated to the surroundings.

Another object of the present invention is to provide a wireless power feeding system and a wireless power feeding method which enable reduction of power loss when power is supplied from a power feeding device to a moving object by wireless communication. Another object of the present invention is to provide a wireless power feeding system and a wireless power feeding method which enable reduction in strength of a radio wave, which is radiated from a power feeding device to the surroundings during a charging operation.

In order to solve the above problems, according to one embodiment of the present invention, before power is supplied to a moving object, a radio wave for alignment of antennas is output from a power feeding device. That is, a radio wave is output from a power feeding device in two stages. In a first stage, a radio wave is output to align the positions of the antennas of the power feeding device and the moving object. In a second stage, a radio wave is output to supply power from the power feeding device to the moving object.

When the radio wave in the first stage is output from the power feeding device, the moving object receives the radio wave and converts it into an electric signal. Strength of the electric signal includes data on a positional relationship in distance, direction, or the like between the antenna of the power feeding device and the antenna of the moving object. Thus, the electric signal is used to detect the positional relationship between the antennas. Accordingly, the position or direction of the moving object or the power feeding device can be modified to provide the optimal positional relationship for the supply of power.

In addition, the strength of the radio wave which is output in the first stage may be sufficient as long as the positional relationship between the antenna of the power feeding device and the antenna of the moving object can be detected. Accordingly, the strength of the radio wave which is output in the first stage can be lower than strength of the radio wave for supply of power into the moving object, which is output in the second stage.

As used herein, the term "moving object" means something driven by an electric motor using power stored in a secondary battery and includes, for example, automobiles (automatic two-wheeled cars, three or more-wheeled automobiles), motorized bicycles including a motor-assisted bicycle, aircrafts, boats, and railroad cars.

Specifically, according to one embodiment of the present invention, a moving object includes an antenna circuit which generates a first electric signal and a second electric signal from a first radio wave and a second radio wave sequentially transmitted from a power feeding device, respectively; a signal processing circuit which extracts data on a positional relationship between the power feeding device and the moving object, using the first electric signal; a secondary battery which stores electric energy using the second electric signal; and an electric motor into which electric energy from the secondary battery is supplied.

In addition, according to one embodiment of the present invention, a wireless power feeding system includes a power feeding device including a first antenna circuit; and a moving object. The moving object includes a second antenna circuit which generates a first electric signal and a second electric signal from a first radio wave and a second radio wave sequentially transmitted from the first antenna circuit, respectively; a signal processing circuit which extracts data on a positional relationship between the moving object and the power feeding device, using the first electric signal; a secondary battery which stores electric energy using the second electric signal; and an electric motor into which electric energy from the secondary battery is supplied.

In addition, according to one embodiment of the present invention, a wireless power feeding method includes transmitting a first radio wave from a first antenna circuit of a power feeding device; generating a first electric signal from the first radio wave in a second antenna circuit of a moving object; extracting data on a positional relationship between the power feeding device and the moving object, using the first electric signal in a signal processing circuit of the moving object, in order to determine whether or not a second radio wave is transmitted from the first antenna circuit based on the positional relationship; generating a second electric signal from the second radio wave in the second antenna circuit if the second radio wave is transmitted from the first antenna circuit; storing electric energy in a secondary battery of the moving object, using the second electric signal; and supplying the electric energy from the secondary battery to an electric motor of the moving object.

In addition, a driver of the moving object or a controller of operation of the power feeding device may manually determine whether to start charging the secondary battery based on data on the positional relationship between the power feeding device and the moving object, which is extracted by the signal processing circuit. Alternatively, the signal processing circuit of the moving object may determine whether to start charging of the secondary battery and transmit a result of the determination, as a radio wave signal, to the power feeding device. Alternatively, the data on the positional relationship between the power feeding device and the moving object may be, as it is, transmitted, as a radio wave signal, from the moving object to the power feeding device in which it may be then determined whether to start the charging of the secondary battery.

According to one embodiment of the present invention, the positional relationship between the antenna of the power feeding device and the antenna of the moving object can be easily optimized, which may result in reduction of power loss which may be caused when the battery is charged. In addition, it is possible to reduce the strength of a radio wave radiated to the surroundings from the power feeding device without being used for charging.

DETAILED DESCRIPTION OF THE INVENTION

Hereinafter, embodiments of the present invention will be described in detail with reference to the accompanying drawings. However, it should be understood to those skilled in the art that the present invention is not limited to the following description and various modifications and changes may be made without departing from the spirit and scope of the invention. Therefore, the present invention should not be construed as being limited to the disclosed embodiments.

Embodiment 1

Figure 1:
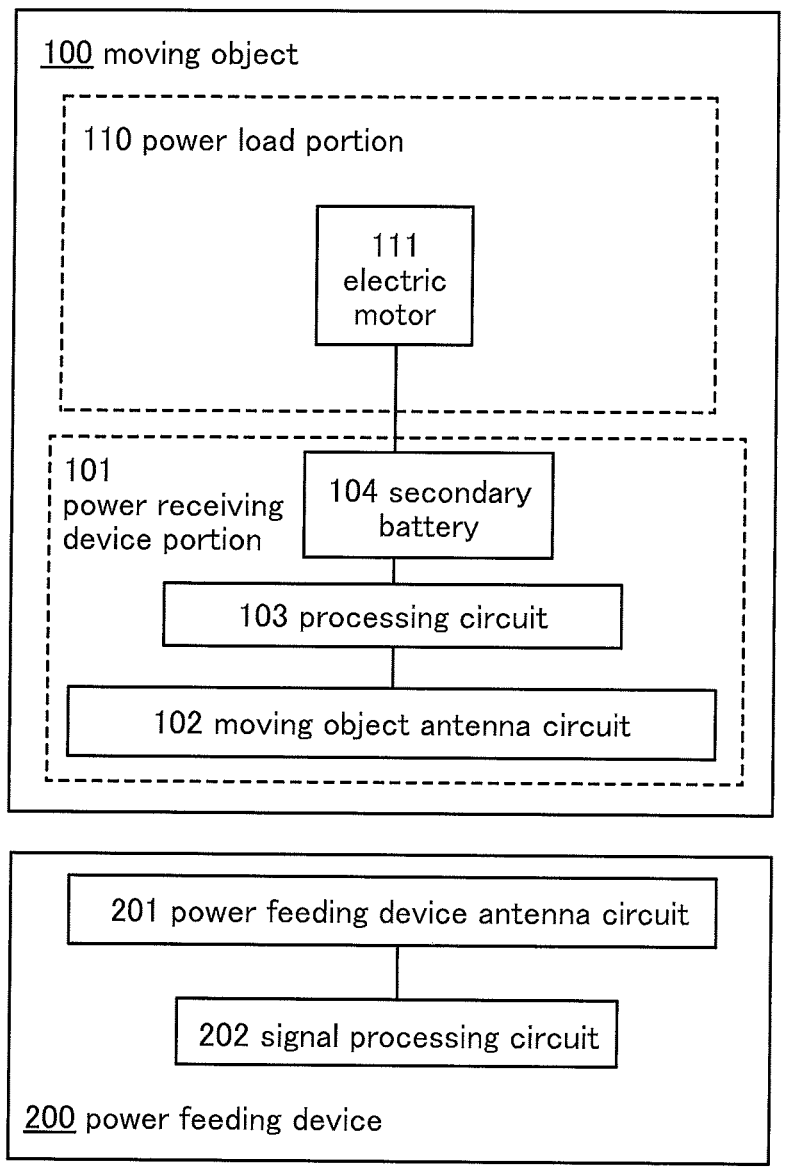
FIG. 1 is a view showing configurations of a moving object and a wireless power feeding system.

A configuration of a moving object and a wireless power feeding system using the moving object and a power feeding device according to one embodiment of the present invention are shown in a block diagram of FIG. 1 by way of an example. Although the block diagram shows separate elements within the moving object or the power feeding device according to their functions, as independent blocks, it may be practically difficult to completely separate the elements according to their functions and, in some cases, one element may involve a plurality of functions.

As shown in FIG. 1, a moving object 100 includes a power receiving device portion 101 and a power load portion 110. The power receiving device portion 101 includes at least a moving object antenna circuit 102, a signal processing circuit 103, and a secondary battery 104. In addition, the power load portion 110 includes at least an electric motor 111.

In addition, the secondary battery 104 is a charge storage means. Examples of the charge storage means include a lead-acid battery, a nickel-cadmium battery, a nickel-hydride battery, and a lithium-ion battery.

In addition, a power feeding device 200 includes a power feeding device antenna circuit 201 and a signal processing circuit 202. The signal processing circuit 202 controls operation of the power feeding device antenna circuit 201. That is, the signal processing circuit 202 can control the strength, the frequency, and the like of radio waves transmitted from the power feeding device antenna circuit 201.

The power feeding device 200 transmits an alignment radio wave as a test signal from the power feeding device antenna circuit 201 in order to align the moving object 100 and the power feeding device 200 before supplying power to the moving object 100. The moving object 100 receives the test signal in the moving object antenna circuit 102, converts it into an electric signal, and then transmits the electric signal to the signal processing circuit 103.

The strength of the received test signal depends on a positional relationship in distance, direction, or the like between the moving object antenna circuit 102 and the power feeding device antenna circuit 201. The signal processing circuit 103 extracts data on the positional relationship between the moving object antenna circuit 102 and the power feeding device antenna circuit 201 from the strength of the received test signal.

If the strength of the received test signal is sufficiently high, it means that an efficiency of energy conversion in converting the radio wave into the electric signal is sufficiently high. Accordingly, the positional relationship between the moving object antenna circuit 102 and the power feeding device antenna circuit 201 is determined to be in a state adapted to start of charging.

On the contrary, if the strength of the received test signal is insufficient, it means that an efficiency of energy conversion in converting the radio wave into the electric signal is low. Accordingly, the positional relationship between the moving object antenna circuit 102 and the power feeding device antenna circuit 201 is determined to be not in a state adapted to start of charging.

The criterion for determining whether or not the positional relationship between the moving object antenna circuit 102 and the power feeding device antenna circuit 201 is in a state adapted to start of charging may be properly set by a designer.

In addition, a driver of the moving object 100 or a controller of operation of the power feeding device 200 may manually determine whether to start charging of the secondary battery 104 based on data on the positional relationship extracted by the signal processing circuit 103.

The charging of the secondary battery 104 is performed by transmitting a charging radio wave from the power feeding device antenna circuit 201 of the power feeding device 200. In the moving object 100, the charging radio wave is received in the moving object antenna circuit 102 and converted into an electric signal, and then the electric signal is transmitted to the signal processing circuit 103. Then, the electric signal is transmitted from the signal processing circuit 103 to the secondary battery 104 in which the electric signal is stored as electric energy.

The electric motor 111 drives the moving object 100 by converting the electric energy stored in the secondary battery 104 into mechanical energy.

If the strength of the test signal is insufficient so that the charging cannot be started, the positional relationship between the moving object antenna circuit 102 and the power feeding device antenna circuit 201 is modified by changing the position or direction of the moving object 100 or the power feeding device 200. Alternatively, the positional relationship may be modified by directly changing the position or direction of the moving object antenna circuit 102 or the power feeding device antenna circuit 201 without moving the moving object 100 or the power feeding device 200. After modifying the positional relationship, a test signal is used to redetermine whether or not the positional relationship between the moving object antenna circuit 102 and the power feeding device antenna circuit 201 is in a state adapted to start of the charging.

The strength of the radio wave transmitted as the test signal may be sufficient as long as the positional relationship between the moving object antenna circuit 102 and the power feeding device antenna circuit 201 can be detected. Thus, the strength of the radio wave can be sufficiently lower than that of the charging radio wave.

If test signals are transmitted plural times for the alignment, the strengths of the test signals to be transmitted may not be necessarily equal to each other. For example, the strength of a test signal transmitted for alignment may be lowered for each alignment. Alternatively, if the positional relationship between the power feeding device antenna circuit 201 and the moving object antenna circuit 102 is unsuitable so that a test signal transmitted first cannot be received, a test signal with a strength higher than that of the first test signal may be transmitted next.

In one embodiment of the present invention, the charging radio wave has no limitation on its frequency and may have any band of frequency as long as power can be transmitted. For example, the charging radio wave may have any of an LF band of 135 kHz (long wave), a HF band of 13.56 MHz, a UHF band of 900 MHz to 1 GHz, and a microwave band of 2.45 GHz.

In addition, the radio wave used as the test signal may have the same frequency band as the charging radio wave or a frequency band different from that of the charging radio wave.

A radio wave transmission method may be properly selected from various methods including an electromagnetic coupling method, an electromagnetic induction method, a resonance method, and a microwave method. In one embodiment of the present invention, in order to prevent energy loss due to foreign substances containing moisture, such as rain and mud, the electromagnetic induction method or the resonance method using a low frequency band, more specifically, frequencies of a short wave of 3 MHz to 30 MHz, a medium wave of 300 kHz to 3 MHz, a long wave of 30 kHz to 300 kHz, or a very-low frequency wave of 3 kHz to 30 kHz, may be used.

In one embodiment of the present invention, the data on the positional relationship between the moving object antenna circuit 102 and the power feeding device antenna circuit 201 may be extracted from the strength of the test signal. The data on the positional relationship helps the driver of the moving object 100 to align the moving object 100 and the power feeding device 200 while driving the moving object 100. Alternatively, this data helps the controller of operation of the power feeding device 200 to align the moving object 100 and the power feeding device 200 while operating the power feeding device 200. Accordingly, the moving object 100 and the power feeding device 200 can be easily aligned to prevent power loss which may be caused when the battery is charged. In addition, the strength of a radio wave radiated to the surroundings from the power feeding device 200 without being used for charging can be low.

Embodiment 2

In this embodiment, more detailed configurations of the moving object and the wireless power feeding system using the moving object and the power feeding device according to one embodiment of the present invention will be described.

Figure 2:
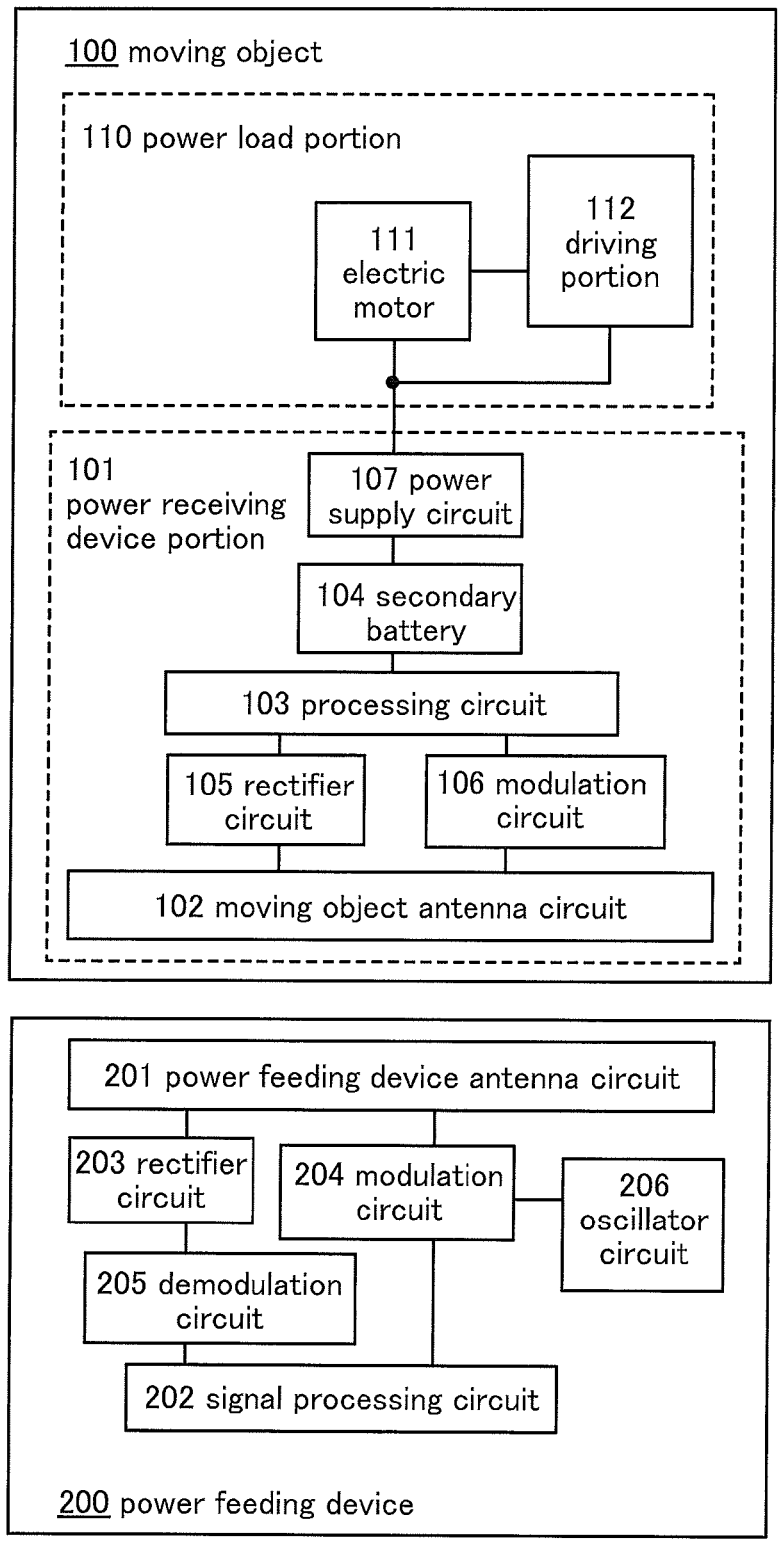
FIG. 2 is a view showing configurations of a moving object and a wireless power feeding system.

The configurations of the moving object and the wireless power feeding system using the moving object and the power feeding device according to one embodiment of the present invention are shown in a block diagram of FIG. 2 by way of an example. As shown in FIG. 2, the moving object 100 includes the power receiving device portion 101 and the power load portion 110 as in FIG. 1.

The power receiving device portion 101 includes at least the moving object antenna circuit 102, the signal processing circuit 103, the secondary battery 104, a rectifier circuit 105, a modulation circuit 106 and a power supply circuit 107.

The power load portion 110 includes at least the electric motor 111 and a driving portion 112 whose operation is controlled by the electric motor 111.

In addition, the power feeding device 200 includes at least the power feeding device antenna circuit 201, the signal processing circuit 202, a rectifier circuit 203, a modulation circuit 204, a demodulation circuit 205 and an oscillator circuit 206.

Subsequently, operations of the moving object 100 and the power feeding device 200 shown in FIG. 2 will be described with reference to a flow chart shown in FIG. 3.

The operations of the moving object 100 and the power feeding device 200 shown in FIG. 2 may include a first stage of aligning the moving object 100 and the power feeding device 200 and a second stage of performing a charging operation, as will be described below.

First, in the first stage, an alignment radio wave as a test signal is transmitted from the power feeding device antenna circuit 201 (A01: transmission of a test signal). Specifically, the signal processing circuit 202 generates a signal required for alignment. This signal contains data on the strength, the frequency, and the like of the radio wave. In accordance with this signal and a signal having a certain frequency generated in the oscillator circuit 206, the modulation circuit 204 applies a voltage to the power feeding device antenna circuit 201, whereby the alignment radio wave is transmitted, as the test signal, from the power feeding device antenna circuit 201.

The test signal transmitted from the power feeding device antenna circuit 201 is received by the moving object antenna circuit 102 of the moving object 100 (B01: reception of the test signal). The moving object antenna circuit 102 converts the received test signal into an electric signal which is then rectified in the rectifier circuit 105 and is then transmitted to the signal processing circuit 103.

The strength of the received test signal depends on the positional relationship in distance, direction, or the like between the moving object antenna circuit 102 and the power feeding device antenna circuit 201. The signal processing circuit 103 extracts data on the positional relationship between the moving object antenna circuit 102 and the power feeding device antenna circuit 201, from data on the strength of the test signal in the electric signal transmitted from the rectifier circuit 105.

Then, the signal processing circuit 103 determines based on the strength of the received test signal whether or not the positional relationship between the moving object antenna circuit 102 and the power feeding device antenna circuit 201 is in a state adapted to start of charging (B02: determination of whether a state is adapted to start of charging).

If the strength of the received test signal is insufficient, it means that the efficiency of energy conversion in converting the radio wave into the electric signal is low. Accordingly, the positional relationship between the moving object antenna circuit 102 and the power feeding device antenna circuit 201 is determined to be not in a state adapted to start of the charging. When such determination is made, the positional relationship between the moving object antenna circuit 102 and the power feeding device antenna circuit 201 is modified by changing the position or direction of the moving object 100 or the power feeding device 200 (B03: modification of the positional relationship between antenna circuits). Alternatively, the positional relationship may be modified by directly changing the position or direction of the moving object antenna circuit 102 or the power feeding device antenna circuit 201 without moving the moving object 100 or the power feeding device 200. After modifying the positional relationship, the steps from the step A01 (transmission of a test signal) to the step B02 (determination of whether a state is adapted to start of charging) are repeated for the alignment.

If the strength of the received test signal is sufficiently high, it means that an efficiency of energy conversion in converting the radio wave into the electric signal is sufficiently high. Accordingly, the positional relationship between the moving object antenna circuit 102 and the power feeding device antenna circuit 201 is determined to be in a state adapted to start of charging.

If the positional relationship is determined to be in a state adapted to start of charging, it means that the alignment has been finished and preparation for charging has been completed. Then, the signal processing circuit 103 generates a signal for notifying the power feeding device 200 of the completed preparation. When the modulation circuit 106 applies a voltage to the moving object antenna circuit 102 in accordance with the generated signal, the signal for notification of completed preparation is transmitted from the moving object antenna circuit 102 by a radio wave (B04: transmission of a signal for notification of completed preparation).

The signal for notification of the completed preparation is received by the power feeding device antenna circuit 201 of the power feeding device 200 by the radio wave (A02: reception of the signal for notification of completed preparation). The power feeding device antenna circuit 201 converts the received signal into an electric signal which is then rectified in the rectifier circuit 203. The rectified signal is demodulated in the demodulation circuit 205 and is then transmitted to the signal processing circuit 202. When the signal processing circuit 202 receives the signal for notification of the completed preparation (the demodulated signal), the operations of the moving object 100 and the power feeding device 200 proceed from the first stage to the second stage.

In the second stage, a charging radio wave is transmitted from the power feeding device antenna circuit 201 (A03: transmission of a charging radio wave). Specifically, the signal processing circuit 202 generates a signal required for charging. This signal contains data on the strength, the frequency, and the like of the radio wave. In accordance with this signal and a signal having a certain frequency generated in the oscillator circuit 206, the modulation circuit 204 applies a voltage to the power feeding device antenna circuit 201, whereby the charging radio wave is transmitted from the power feeding device antenna circuit 201.

The charging radio wave transmitted from the power feeding device antenna circuit 201 is received by the moving object antenna circuit 102 of the moving object 100. The moving object antenna circuit 102 converts the received charging radio wave into an electric signal which is then rectified in the rectifier circuit 105 and is then transmitted to the signal processing circuit 103. Then, the rectified electric signal is transmitted from the signal processing circuit 103 to the secondary battery 104 in which the electric signal is stored as electric energy.

When charging of the secondary battery 104 has been completed (B05: completion of the charging), the signal processing circuit 103 generates a signal for notifying the power feeding device 200 of the completed charging. When the modulation circuit 106 applies an AC voltage to the moving object antenna circuit 102 in accordance with the generated signal, a signal for notification of the completed charging is transmitted from the moving object antenna signal 102 by a radio wave (B06: transmission of a signal for notification of completed charging).

The signal for notification of the completed charging is received by the power feeding device antenna circuit 201 of the power feeding device 200 by the radio wave (A04: reception of the signal for notification of completed charging). The power feeding device antenna circuit 201 converts the received signal into an electric signal which is then rectified in the rectifier circuit 203. The rectified signal is demodulated in the demodulation circuit 205 and is then transmitted to the signal processing circuit 202. Upon receiving the signal for notification of the completed charging (the demodulated signal), the signal processing circuit 202 transmits a signal for stopping the transmission of the radio wave to the oscillator circuit 206 and the modulation circuit 204 to stop the transmission of the charging radio wave (A05: stop of the transmission of a charging radio wave).

The electric energy stored in the secondary battery 104 is made into a constant voltage in the power supply circuit 107, which is then supplied to the electric motor 111. The electric motor 111 converts the supplied electric energy into mechanical energy to actuate the driving portion 112.

Although in this embodiment the signal processing circuit 103 of the moving object 100 determines whether to start the charging of the secondary battery 104 and a result of the determination is transmitted to the power feeding device 200 by a radio wave, the present invention is not limited thereto. For example, the data on the positional relationship between the power feeding device 200 and the moving object 100 may be, as it is, transmitted, as a radio wave signal, from the moving object 100 to the power feeding device 200 in which it may be then be determined whether to start the charging of the secondary battery 104. In this case, the positional relationship may be modified by movement of the power feeding device 200. Alternatively, a signal for requesting modification of the positional relationship may be sent from the power feeding device 200 to the moving object 100 and the positional relationship may be modified by movement of the moving object 100. In addition, since there is no need to send a signal for notification of completed preparation for charging from the moving object 100 to the power feeding device 200, the operations of the moving object 100 and the power feeding device 200 may proceed directly from the step B02 (determination of whether a state is adapted to start of charging) to the step A03 (transmission of a charging radio wave).

A modulation method used in the modulation circuit 106 or the modulation circuit 204 may be properly selected from various methods including amplitude modulation, frequency modulation, and phase modulation.

The modulation circuit 106 modulates a carrier (a carrier wave) transmitted from the power feeding device antenna circuit 201 by applying an AC voltage to the moving object antenna circuit 102 in accordance with the signal for notification of the completed preparation or the signal for notification of the completed charging, whereby the signal is transmitted from the moving object 100 to the power feeding device 200.

Figure 4:
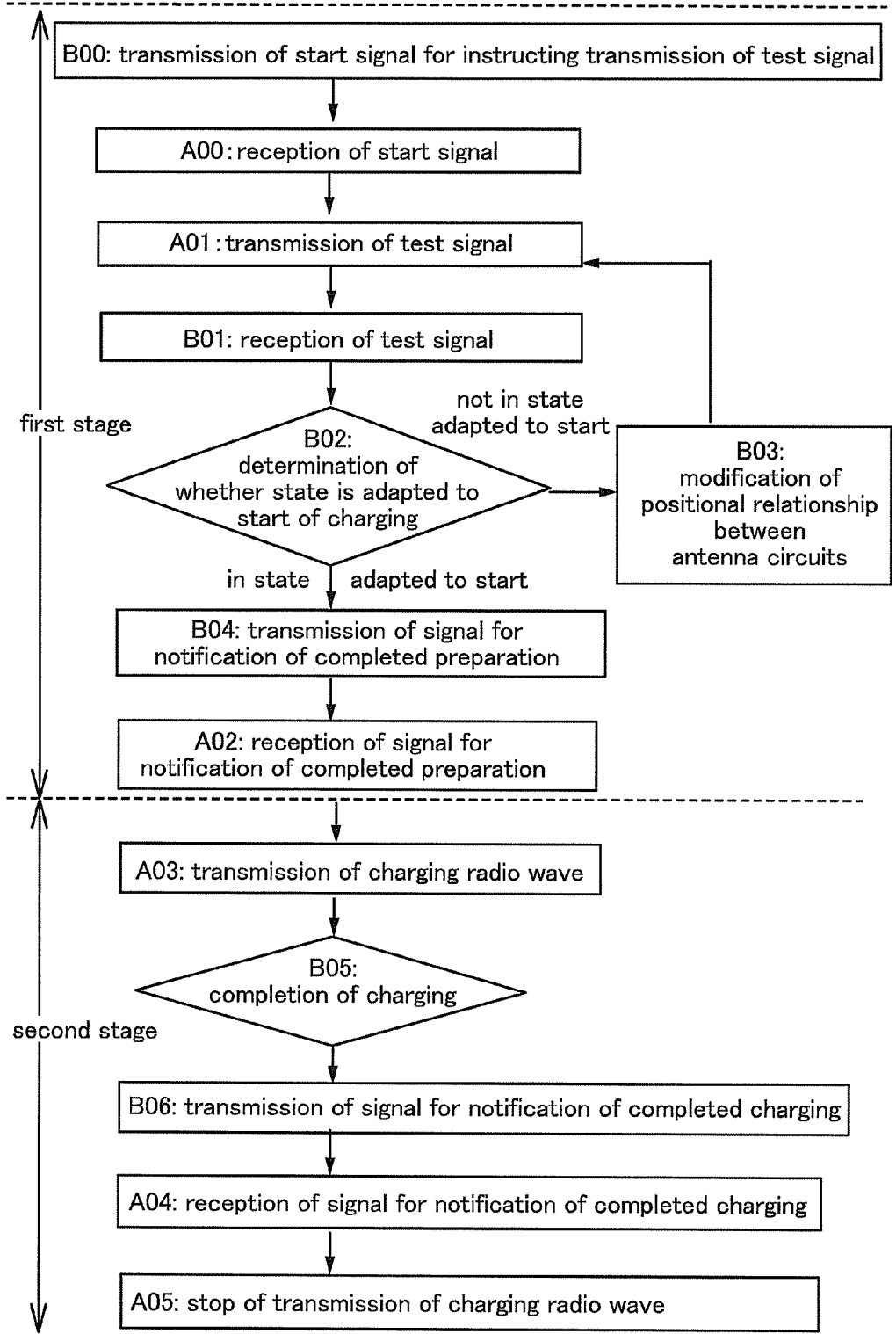
FIG. 4 is a flow chart showing operations of a moving object and a power feeding device.

In addition, in the first stage, in order to instruct the power feeding device 200 to transmit the test signal, an oscillator circuit may be provided in the power receiving device portion 101 of the moving object 100 and a start signal may be transmitted from the moving object 100. In this case, the oscillator circuit may be electrically connected to the modulation circuit 106. FIG. 4 is a flow chart showing the case where the start signal is transmitted from the moving object 100. In the flow chart shown in FIG. 4, the signal processing circuit 103 generates the start signal. The start signal contains data on the strength, the frequency, and the like of a radio wave. Then, the modulation circuit 106 applies a voltage to the moving object antenna circuit 102 in accordance with this start signal and a signal having a certain frequency generated in the oscillator circuit so that the start signal is transmitted from the moving object antenna circuit 102 by a radio wave (B00: transmission of the start signal for instructing transmission of the test signal).

Then, the start signal is received by the power feeding device antenna circuit 201 of the power feeding device 200 (A00: reception of the start signal). The power feeding device antenna circuit 201 converts the received signal into an electric signal which is then rectified in the rectifier circuit 203. The rectified signal is demodulated in the demodulation circuit 205 and is then transmitted to the signal processing circuit 202.

Upon receiving the start signal, the signal processing circuit 202 generates a signal required for alignment. This signal contains data on the strength, the frequency, and the like of a radio wave. In accordance with this signal and a signal having a certain frequency generated in the oscillator circuit 206, the modulation circuit 204 applies a voltage to the power feeding device antenna circuit 201, whereby an alignment radio wave is transmitted, as a test signal, from the power feeding device antenna circuit 201 (A01: transmission of a test signal). Steps following the step A01 (transmission of a test signal) are the same as those in the flow chart of FIG. 3; thus, the above description can be referred to.

Figure 5:
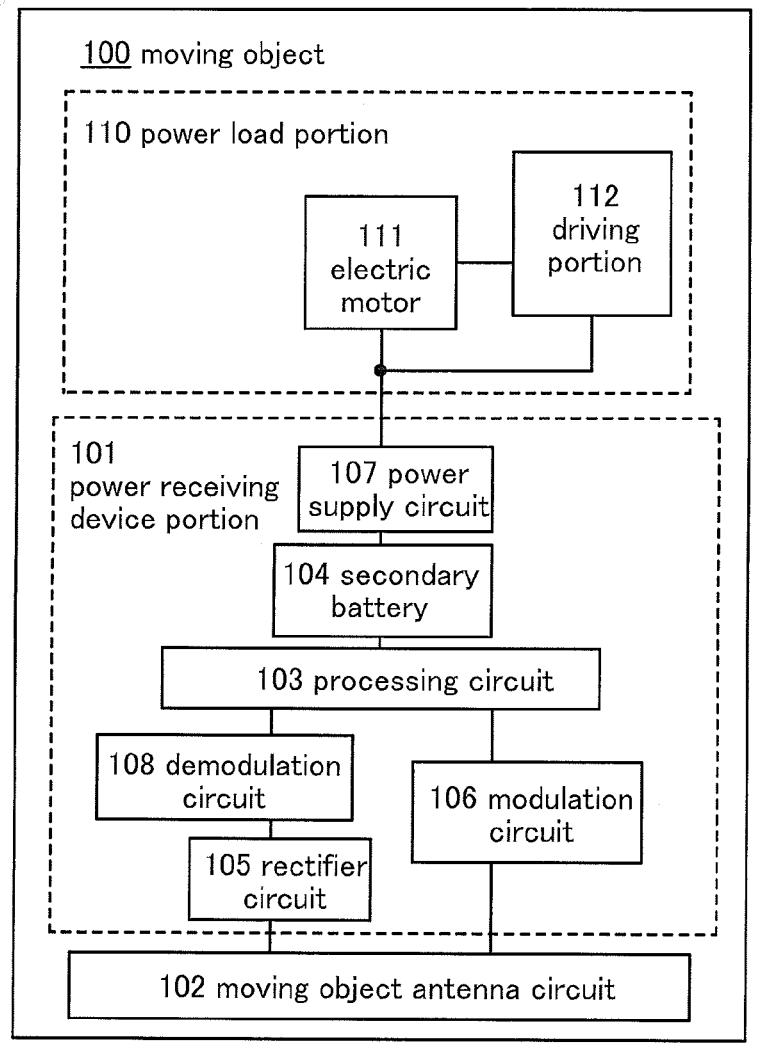
FIG. 5 is a view showing configurations of a moving object and a wireless power feeding system.
Figure 5:
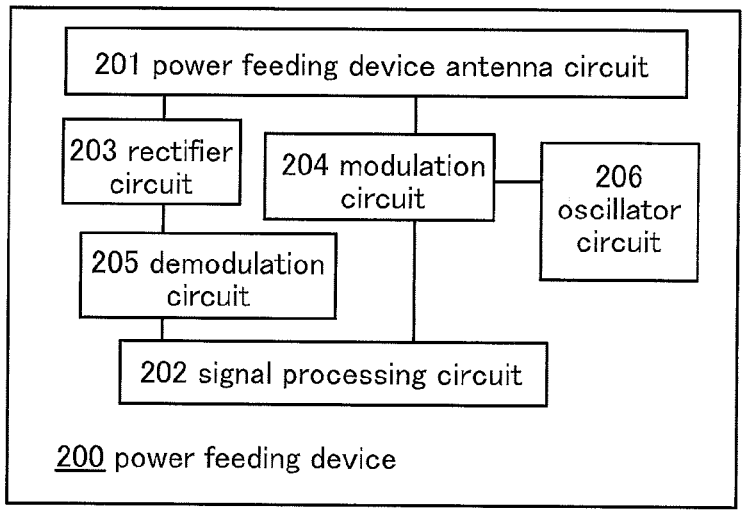

In addition, the moving object 100 shown in FIG. 2 may include a demodulation circuit in the power receiving device portion 101. Configurations of the moving object and the wireless power feeding system using the moving object and the power feeding device in the case where the moving object 100 includes a demodulation circuit 108 are shown in a block diagram of FIG. 5 by way of an example. FIG. 5 is different from FIG. 2 in that the moving object 100 includes the demodulation circuit 108 in the power feeding device portion 101.

Figure 3:
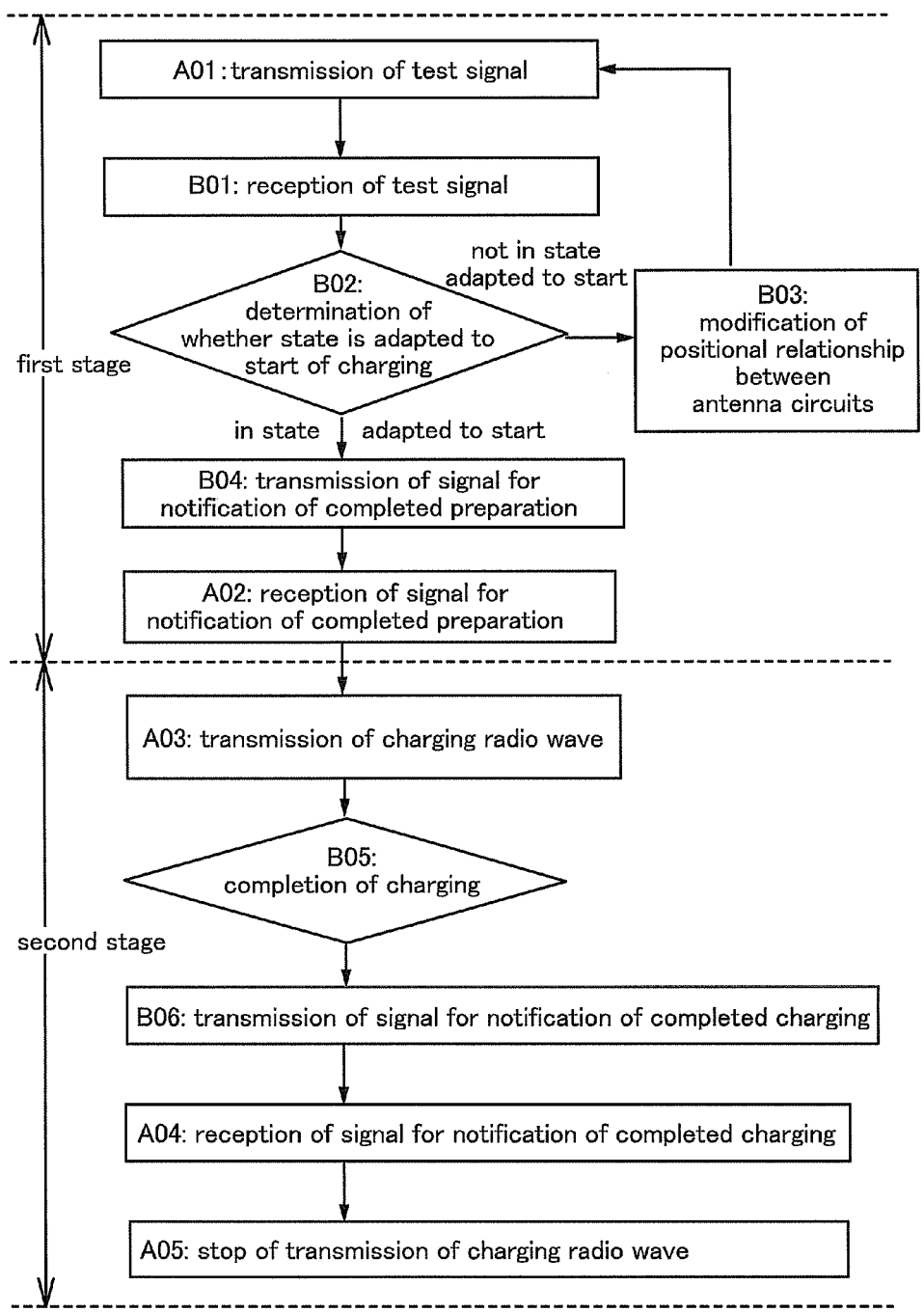
FIG. 3 is a flow chart showing operations of a moving object and a power feeding device.

Operations of the moving object 100 and the power feeding device 200 shown in FIG. 5 can be described according to the flow charts shown in FIG. 3 and FIG. 4, as in the case of FIG. 2. However, if these operations are performed in accordance with the flow chart shown in FIG. 4, an oscillator circuit may be installed in the power receiving device portion 101 of the moving object 100 and may be electrically connected to the modulation circuit 106. In addition, in FIG. 5, upon receiving a test signal by a radio wave (B01: reception of the test signal), the moving object antenna circuit 102 converts the received test signal into an electric signal which is then rectified in the rectifier circuit 105 and then demodulated in the demodulation circuit 108. Then, the demodulated test signal is sent to the signal processing circuit 103.

If the strength of the demodulated test signal is insufficient, the signal processing circuit 103 can not perform signal processing based on the test signal. Accordingly, the operation can not proceed to the next step of generating a signal for notifying the power feeding device 200 of the completed preparation. On the other hand, if the strength of the demodulated test signal is sufficiently high, signal processing is performed based on the test signal. Accordingly, the operation can proceed to the next step of generating a signal for notifying the power feeding device 200 of the completed preparation. That is, since whether the signal processing circuit 103 can perform signal processing depends on the strength of the demodulated test signal, it can be determined based on the strength of the demodulated test signal, whether or not the positional relationship between the moving object antenna circuit 102 and the power feeding device antenna circuit 201 is in a state adapted to start of charging (B02: determination of whether a state is adapted to start of charging).

If the positional relationship is determined to be not in a state adapted to start of the charging, the positional relationship between the moving object antenna circuit 102 and the power feeding device antenna circuit 201 is modified by changing the position or direction of the moving object 100 or the power feeding device 200 (B03: modification of the positional relationship between antenna circuits). Alternatively, the positional relationship may be modified by directly changing the position or direction of the moving object antenna circuit 102 or the power feeding device antenna circuit 201 without moving the moving object 100 or the power feeding device 200. After modifying the positional relationship, the steps from the step A01 (transmission of a test signal) to the step B02 (determination of whether a state is adapted to start of charging) are repeated for the alignment.

If the positional relationship is determined to be in a state adapted to start of charging, the signal processing circuit 103 generates a signal for notifying the power feeding device 200 of completed preparation. Then, the modulation circuit 106 applies an AC voltage to the moving object antenna circuit 102 in accordance with the generated signal so that a signal for notification of completed preparation is transmitted from the moving object antenna circuit 102 by a radio wave (B04: transmission of a signal for notification of completed preparation). Steps following the step B04 (transmission of a signal for notification of completed preparation) are the same as those in the flow charts of FIG. 3 and FIG. 4; thus, the above description can be referred to.

However, in FIG. 5, a charging radio wave may be converted into an electric signal in the moving object antenna circuit 102 and may be transmitted to the signal processing circuit 103 after being rectified in the rectifier circuit 105, without passing through the demodulation circuit 108.

In addition, the moving object 100 shown in FIG. 2 may include a combustion engine for a prime motor, in addition to the electric motor 111. Configurations of the moving object and the wireless power feeding system using the moving object and the power feeding device in the case where the moving object 100 includes a combustion engine are shown in a block diagram of FIG. 6 by way of an example.

Figure 6:
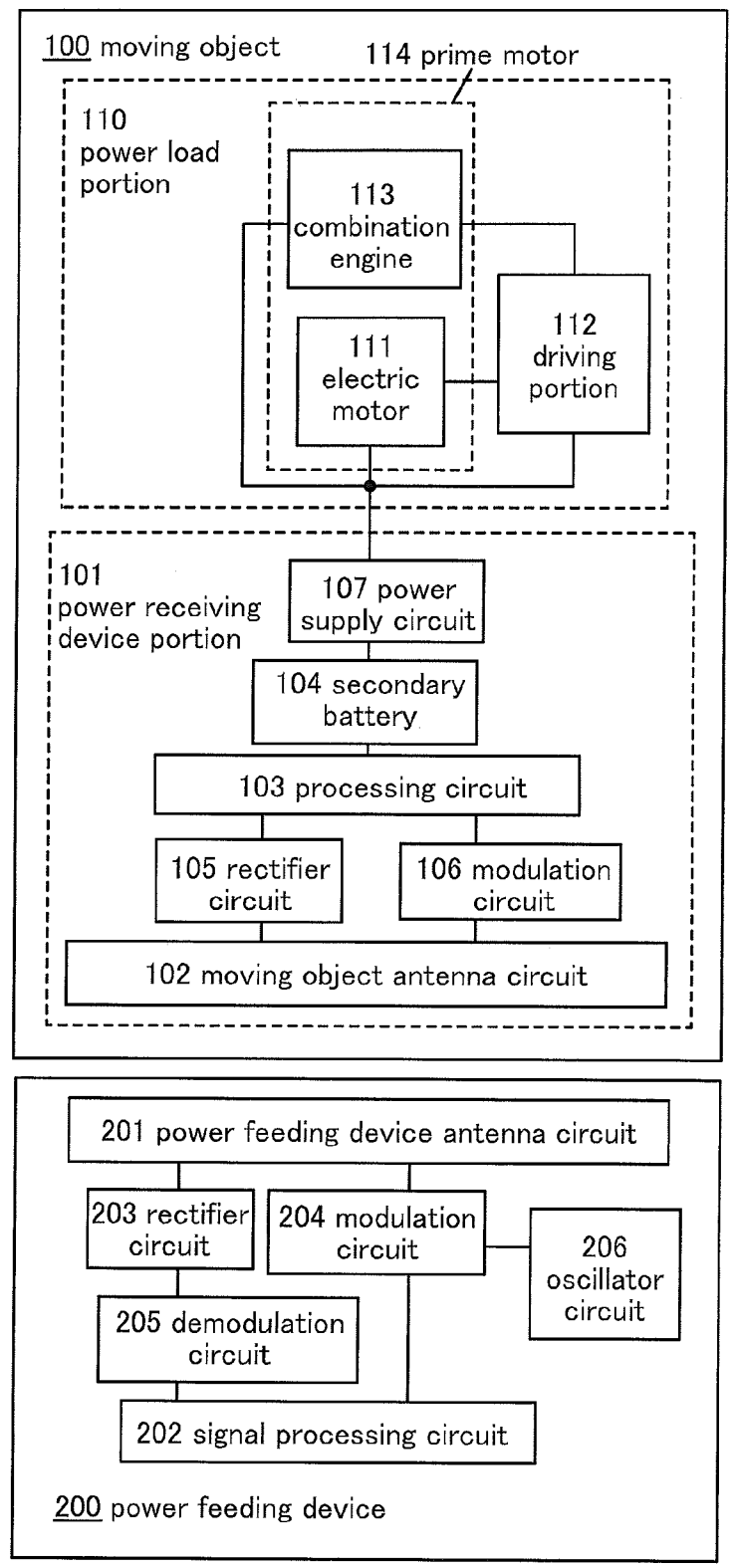
FIG. 6 is a view showing configurations of a moving object and a wireless power feeding system.

Operations of FIG. 6 can be described according to the flow charts shown in FIG. 3 and FIG. 4, as in the cases of FIG. 2 and FIG. 5. However, if these operations are performed in accordance with the flow chart shown in FIG. 4, an oscillator circuit may be installed in the power receiving device portion 101 of the moving object 100 and may be electrically connected to the modulation circuit 106.

FIG. 6 is different from FIG. 2 in that the moving object 100 includes a combustion engine 113 in the power load portion 110 and the electric motor 111 and the combustion engine 113 function as a prime motor 114. The electric energy stored in the secondary battery 104 is made into a constant voltage in the power supply circuit 107, which is then supplied to the electric motor 111 and the combustion engine 113.

The electric motor 111 converts the supplied electric energy into mechanical energy to actuate the driving portion 112. In addition, as a spark plug is ignited by the supplied electric energy, the combustion engine 113 is started to actuate the driving portion 112.

In addition, the moving object 100 shown in FIG. 2 may include an output device in the power load portion 110. Configurations of the moving object and the wireless power feeding system using the moving object and the power feeding device in the case where the moving object 100 includes an output device 115 in the power load portion 110 are shown in a block diagram of FIG. 7 by way of an example.

Figure 7:
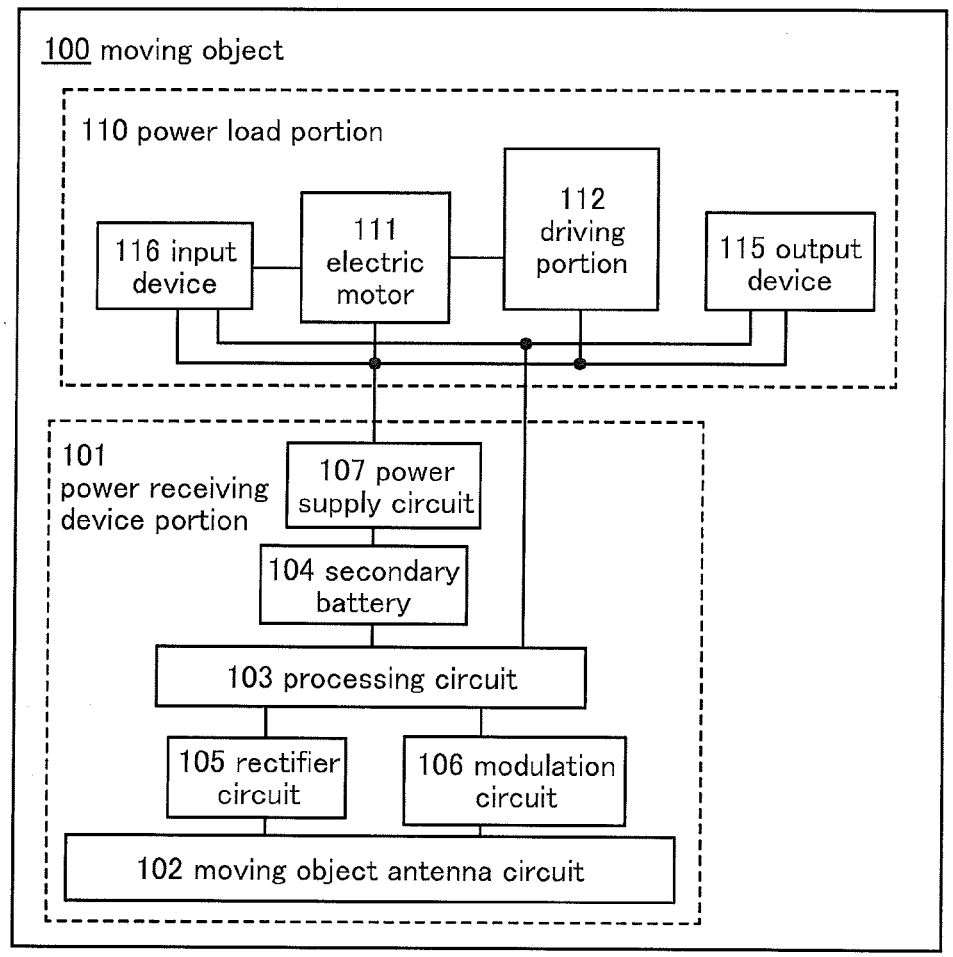
FIG. 7 is a view showing configurations of a moving object and a wireless power feeding system.
Figure 7:
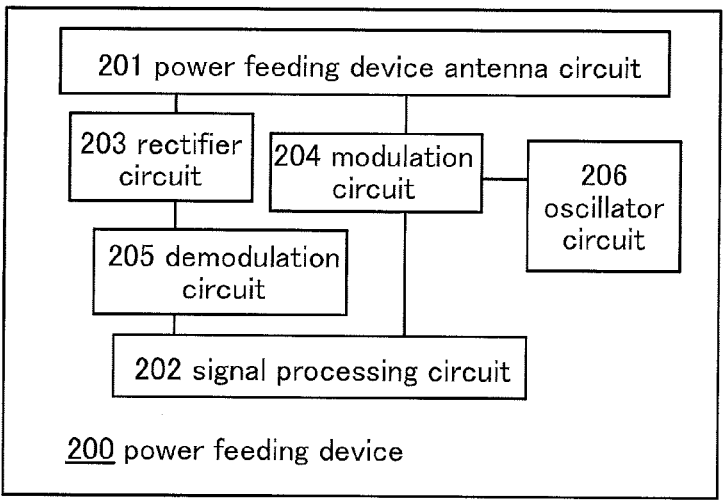

FIG. 7 is different from FIG. 2 in that the moving object 100 includes the output device 115 and an input device 116 in the power load portion 110. The output device 115 is a device which outputs data extracted from a test signal in the signal processing circuit 103 and examples of the output device 115 include a display, a light, a speaker, and the like. The input device 116 is a device which inputs external data to the moving object 100 and examples of the input device 116 include a handle, a brake, an accelerator, and a switch.

Operations of FIG. 7 can be described according to the flow charts shown in FIG. 3 and FIG. 4, as in the cases of FIG. 2, FIG. 5, and FIG. 6. However, if the operations are performed in accordance with the flow chart shown in FIG. 4, an oscillator circuit may be installed in the power receiving device portion 101 of the moving object 100 and may be electrically connected to the modulation circuit 106.

If it has been determined in the flow chart shown in FIG. 3 or FIG. 4 whether or not the positional relationship between the moving object antenna circuit 102 and the power feeding device antenna circuit 201 is in a state adapted to start of charging (B02: determination of whether the positional relationship is in a state adapted to start of charging), data on the determination result can be output using the output device 115. Alternatively, data on relative strength of a test signal received by the moving object 100 may be output using the output device 115 and the determination of whether the positional relationship is in a state adapted to start of charging may be made by a driver.

A driver of the moving object 100 may use the data output using the output device 115 to determine the positional relationship between the moving object 100 and the power feeding device 200 or whether or not there is a need to modify the positional relationship.

If there is a need to modify the positional relationship, the driver of the moving object 100 inputs data to be used to modify the position or direction of the moving object 100 to the moving object 100 from the input device 116. Then, the operation of the driving portion 112 is controlled based on the data input from the input device 116, whereby the position or direction of the moving object 100 or the moving object antenna circuit 102 is modified.

If there is no need to modify the positional relationship, data on an instruction to proceed to the next step can be input to the moving object 100 from the input device 116.

In addition, the output device 115 may output the data on how far the operation proceeds in a series of steps from the initiation of alignment to the completion of power transmission to the moving object 100.

In addition, in the block diagrams shown in FIG. 2, FIG. 5, FIG. 6, and FIG. 7, a DC-DC converter or an overcharging control circuit for controlling the operation of the power supply circuit 107 so as to prevent overcharging of the secondary battery 104 may be properly installed.

In one embodiment of the present invention, the data on the positional relationship between the moving object antenna circuit 102 and the power feeding device antenna circuit 201 can be extracted from the strength of the test signal. In addition, the data on the positional relationship assists in the alignment of the moving object 100 and the power feeding device 200 while the driver of the moving object 100 is driving the moving object 100. Alternatively, the data on the positional relationship assists in the alignment of the moving object 100 and the power feeding device 200 while a controller of operation of the power feeding device 200 is operating the power feeding device 200. Accordingly, the moving object 100 and the power feeding device 200 can be easily aligned to reduce power loss which may be caused when the battery is charged. In addition, the strength of a radio wave radiated to the surroundings from the power feeding device 200 without being used for the charging can be low.

This embodiment can be implemented in proper combination with any of the other embodiments.

Embodiment 3

In this embodiment, the positional relationship between a moving object antenna circuit of a moving object and a power feeding device antenna circuit of a power feeding device will be described.

Figure 8A:
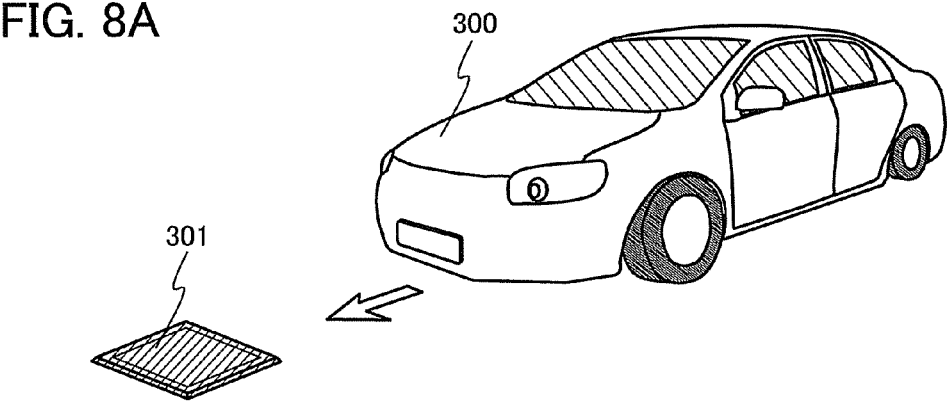
FIGS. 8A to 8C are views showing states where a moving object approaches a power feeding device antenna circuit.

FIG. 8A shows a state where a four-wheeled automobile 300 as one of moving objects approaches a power feeding device antenna circuit 301 of the power feeding device. The automobile 300 approaches the power feeding device antenna circuit 301 in a direction indicated by an arrow.

Figure 8B:
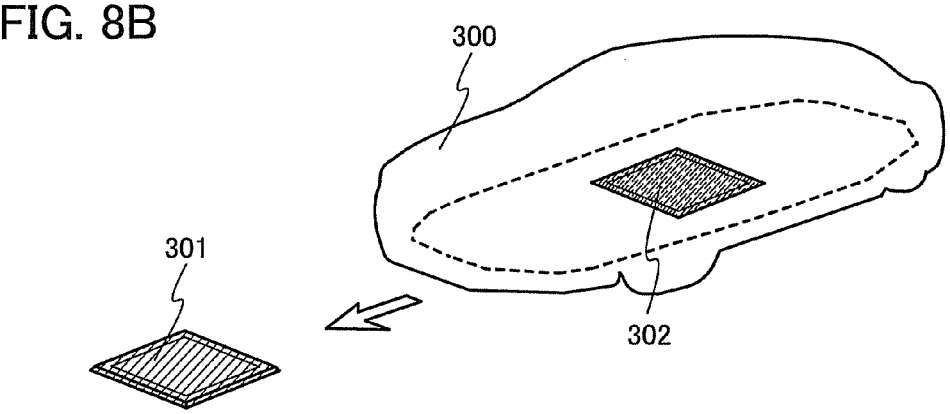

The automobile 300 includes a moving object antenna circuit 302 provided on its bottom portion. In order to clearly show the position of the moving object antenna circuit 302 in the automobile 300, FIG. 8B shows the outline of the automobile 300 and the moving object antenna circuit 302 provided on the bottom portion of the automobile 300.

Figure 8C:
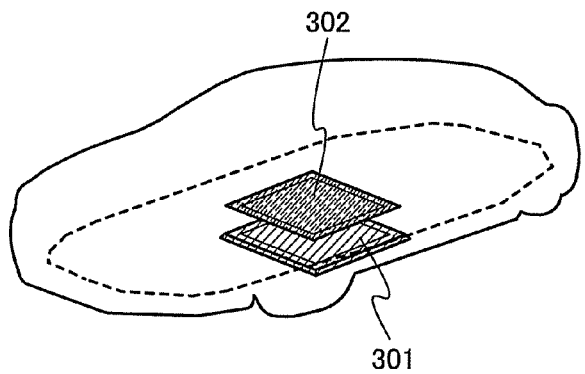

As the automobile 300 moves in the direction of the arrow, the moving object antenna circuit 302 provided on the bottom portion of the automobile 300 finally becomes adjacent to the power feeding device antenna circuit 301, as shown in FIG. 8C.

It may be difficult for a driver of the automobile 300 to exactly detect the positional relationship between the antenna circuits from a driver's seat of the automobile 300 and align the antenna circuits to secure high efficiency conversion, although it depends on where the power feeding device antenna circuit 301 and the moving object antenna circuit 302 are installed. However, in one embodiment of the present invention, since a test signal transmitted from and received by the antenna circuits is used to detect the positional relationship without direct perception of the antenna circuits with the eye, the alignment can be easily achieved.

In addition, as in this embodiment, if the moving object antenna circuit 302 is provided on the bottom portion of the automobile 300 and the power feeding device antenna circuit 301 is placed on a surface of a road or the like on which the automobile 300 moves, a certain interval is always between the antenna circuits. Accordingly, the alignment of the antenna circuits may be achieved by moving the power feeding device antenna circuit 301 in the surface (e.g. a road) on which the automobile 300 moves. Alternatively, this may be achieved by moving the moving object antenna circuit 302 in a surface (e.g. the bottom surface of the automobile) parallel to the surface on which the automobile 300 moves.

In addition, although an efficiency of conversion of energy of a radio wave into electric energy depends greatly on a positional relationship in distance, direction, or the like between the power feeding device antenna circuit 301 and the moving object antenna circuit 302, the directions of the antenna circuits are fixed in FIGS. 8A to 8C. Accordingly, in FIGS. 8A to 8C, the power feeding device antenna circuit 301 and the moving object antenna circuit 302 are only necessary to be aligned so that the distance between the antenna circuits is decreased.

Figure 9A:
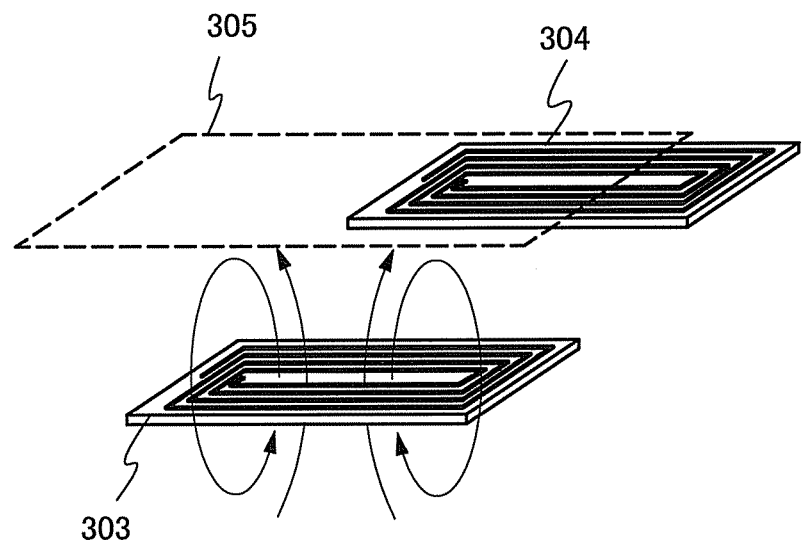
FIGS. 9A and 9B are view showing states where a power feeding device antenna is adjacent to a moving object antenna.

FIG. 9A shows the state where a power feeding device antenna 303 of the power feeding device antenna circuit 301 is adjacent to a moving object antenna 304 of the moving object antenna circuit 302. It is assumed in FIG. 9A that a test signal is transmitted, as a radio wave, from the power feeding device antenna 303.

It is preferable that the moving object antenna 304 is within an optimal area 305 so that radio wave transmitted from the power feeding device antenna 303 is received with high efficiency. Since the conversion efficiency increases when the moving object antenna 304 is within the optimal area 305, the moving object antenna 304 can receive a test signal having high strength. On the contrary, if the moving object antenna 304 is outside the optimal area 305 as shown in FIG. 9A, the conversion efficiency is low; thus, the moving object antenna 304 can not receive a test signal having high strength.

Figure 9B:
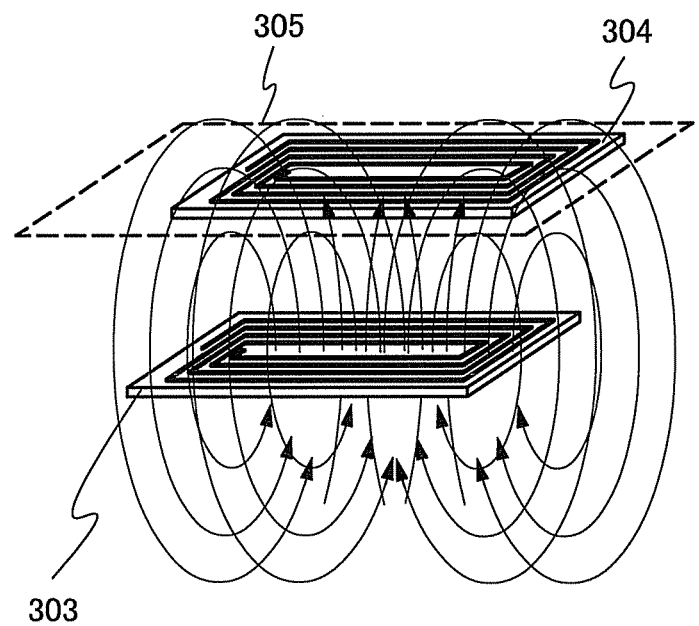

FIG. 9B shows the state where the moving object antenna 304 is within the optimal area 305. It is assumed in FIG. 9B that a charging radio wave is transmitted from the power feeding device antenna 303.

As shown in FIG. 9B, since the conversion efficiency is high when the moving object antenna 304 is within the optimal area 305, it is possible to prevent power loss which may be caused when the battery is charged.

A range of the optimal area 305 may be properly set by a designer. For example, in the case where a radio wave is transmitted/received using an electromagnetic coupling method, when an alternating current (AC) flows in the power feeding device antenna 303, the power feeding device antenna 303 is electromagnetically coupled to the moving object antenna 304, which produces an induced electromotive force in the moving object antenna 304. Accordingly, if an area in which a magnetic flux generated in the power feeding device antenna 303 is most concentrated is set as the optimal area 305, the induced electromotive force generated in the moving object antenna 304 can greatly increases, thereby increasing the conversion efficiency.

This embodiment can be implemented in proper combination with any of the other embodiments.

Embodiment 4

In this embodiment, a configuration of a moving object antenna circuit and a power feeding device antenna circuit will be described.

Figure 10A:
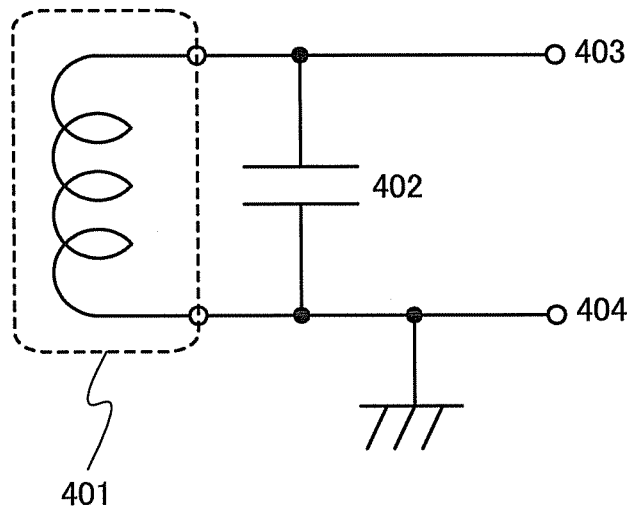
FIGS. 10A and 10B are circuit diagrams of antenna circuits.

Each of a moving object antenna circuit and a power feeding device antenna circuit may be constituted by an LC circuit including an antenna and a capacitor. FIG. 10A shows a circuit diagram of an antenna circuit by way of an example.

As the antenna circuit shown in FIG. 10A, a parallel LC circuit including an antenna 401 and a capacitor 402 is used. Specifically, a pair of terminals of the antenna 401 is respectively connected to an input terminal 403 and an input terminal 404 of the antenna circuit. In addition, a pair of electrodes of the capacitor 402 is respectively connected to the input terminal 403 and the input terminal 404 of the antenna circuit.

An AC voltage is applied between the input terminal 403 and the input terminal 404 of the antenna circuit. In addition, the input terminal 404 is connected to a node given a fixed potential such as a ground potential.

As used herein, the term "connection" means electric connection and corresponds to a state where a current, a voltage, or a potential can be supplied or transmitted. Accordingly, a connection state does not necessarily indicate a direct connection state and may include an indirect connection state via a circuit element such as a wiring, a diode, or a transistor, in which supply or transmission of a current, a voltage, or a potential is possible.

Figure 10B:
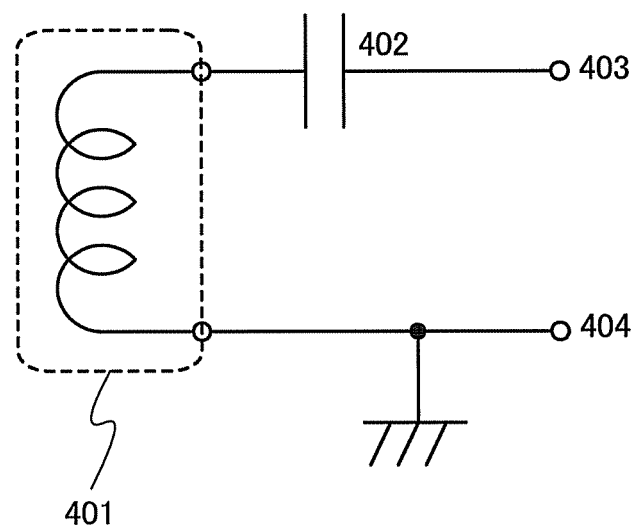

In addition, as an antenna circuit shown in FIG. 10B, a serial LC circuit including an antenna 401 and a capacitor 402 is used. Specifically, one of a pair of electrodes of the capacitor 402 is connected to one of electrodes of the antenna 401, while the other is connected to the input terminal 403 of the antenna circuit. In addition, the other electrode of the antenna 401 is connected to the input terminal 404 of the antenna circuit.

An AC voltage is applied between the input terminal 403 and the input terminal 404 of the antenna circuit. In addition, the input terminal 404 is connected to a node given a fixed potential such as a ground potential.

Although it is illustrated in FIGS. 10A and 10B that the antenna 401 has the shape of a coil, the shape of an antenna usable in the present invention is not limited thereto. The shape of the antenna 401 may be one which can transmit/receive a signal by wireless communication and may be properly selected according to the wavelength and transmission method of a radio wave.

For example, for transmission/reception of a signal using a microwave method, the antenna circuit may use impedance matching with a circuit portion to prevent power loss due to reflection, thereby increasing the efficiency of power transmission. Reactance corresponding to an imaginary part of the impedance depends on capacitance of the capacitor of the antenna circuit. Accordingly, in order to increase the power transmission efficiency, it is preferable to match impedances by optimizing the capacitance of the capacitor.

For transmission/reception of a signal using an electromagnetic induction method, the power transmission efficiency can be increased by optimizing the capacitance of the capacitor included in the antenna circuit.

Figure 11A:
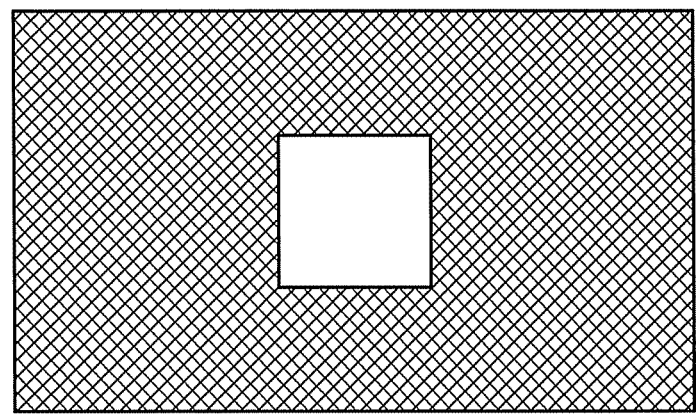
FIGS. 11A to 11C are views each showing a shape of an antenna.
Figure 11B:
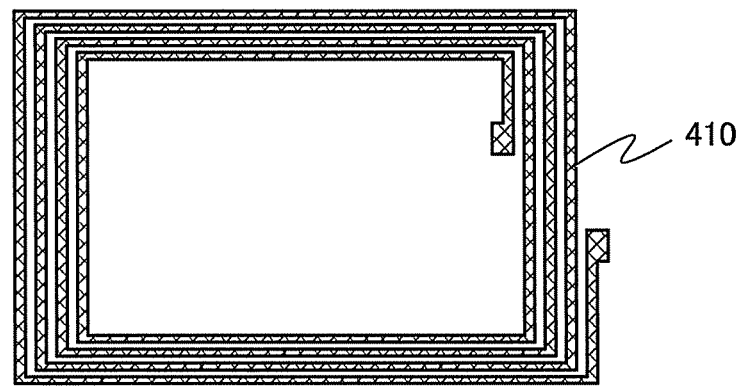
Figure 11C:
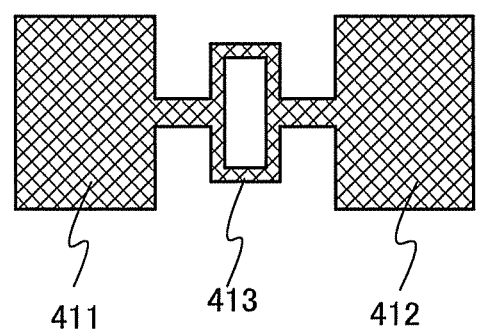

FIGS. 11A to 11C illustrate examples of shapes of antennas. The antenna shown in FIG. 11A has a rectangular flat plate with an opening formed therein. The antenna shown in FIG. 11B has a spiral-shaped conductor 410. The antenna shown in FIG. 11C has plate-shaped patch elements 411 and 412 with a ring-shaped wiring 413 therebetween.

In addition to a coil connected to a feeder line at a power feeding point, the antenna circuit may have a radio wave transmission/reception coil which is not physically connected to the feeder line, like a booster antenna. A communication distance can be extended using the above-described configuration.

This embodiment can be implemented in proper combination with any of the other embodiments.

Embodiment 5

In this embodiment, a configuration of a power feeding device which can facilitate alignment in the case of using a moving object, such as an automobile, which moves not on a rail, will be described.

Figure 12A:
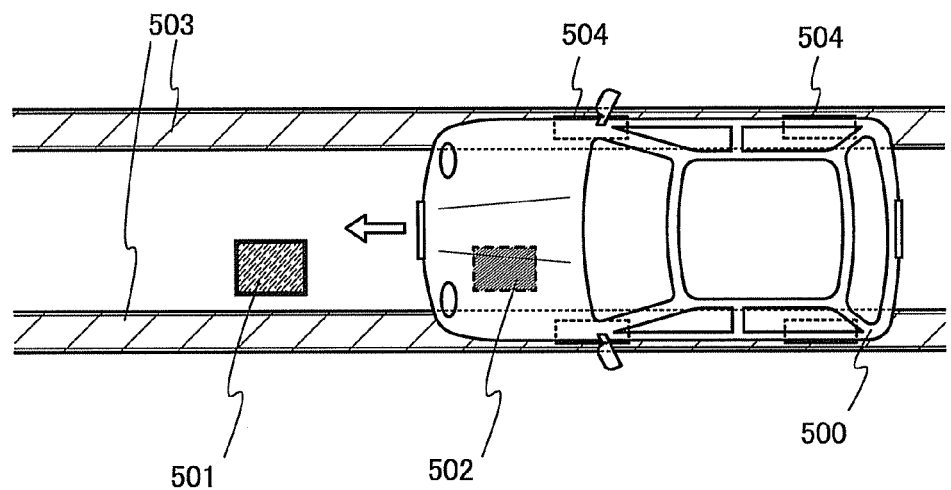
FIGS. 12A and 12B are views showing a power feeding device and a moving object.

FIG. 12A shows a state where a four-wheeled automobile 500 as one type of moving object approaches a power feeding device antenna circuit 501 of the power feeding device. The automobile 500 approaches the power feeding device antenna circuit 501 in a direction indicated by an arrow.

The automobile 500 has a driving wheel 504 which is included in a driving portion and is actuated using mechanical energy from an electric motor. As the driving wheel 504 is rotated, the automobile 500 can be driven. In this embodiment, as shown in FIG. 12A, in order to restrict a direction in which the automobile is driven, a guide 503 to fix a direction of a shaft of the driving wheel 504 is installed in the power feeding device. Accordingly, the driving wheel 504 rotates and moves along a direction in which the guide 503 extends.

Figure 12B:
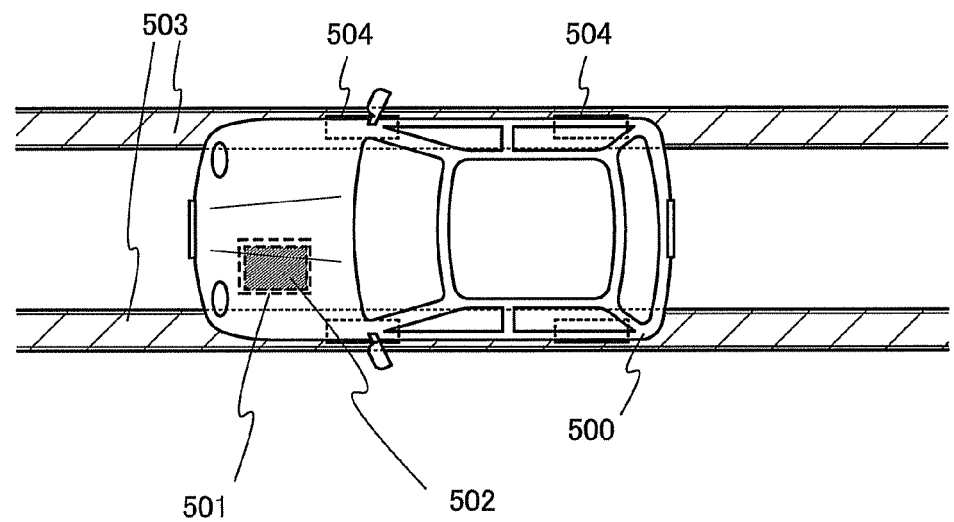

The automobile 500 has a moving object antenna circuit 502 provided on its bottom portion. As the automobile 500 moves in the arrow direction, the moving object antenna circuit 502 provided on the bottom portion of the automobile 500 is finally positioned adjacent to the power feeding device antenna circuit 501, as shown in FIG. 12B.

As in this embodiment, by using the guide 503, it is only necessary to align the power feeding device antenna circuit 501 and the moving object antenna circuit 502 in the direction in which the guide 503 extends. This can facilitate alignment further.

This embodiment can be implemented in proper combination with any of the other embodiments.

Embodiment 6

In one embodiment of the present invention, examples of moving objects include moving means driven by an electric motor using power stored in a secondary battery, such as automobiles (automatic two-wheeled cars, three or more-wheeled automobiles), motorized bicycles including a motor-assisted bicycle, aircrafts, boats, and railroad cars.

Figure 13A:
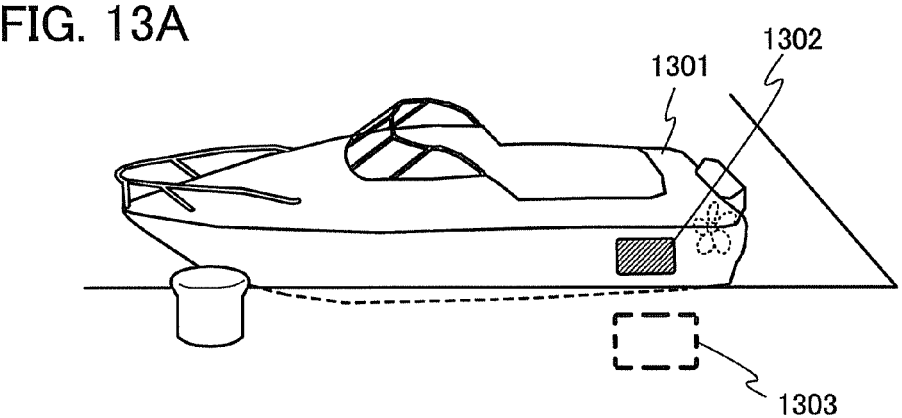
FIGS. 13A and 13B are views each showing a moving object.

FIG. 13A shows a configuration of a motor boat 1301 as one of the moving objects of the present invention. FIG. 13A illustrates the case where the motor boat 1301 includes a moving object antenna circuit 1302 equipped on a side of the body of the boat. For example, a power feeding device for charging the motor boat 1301 may be equipped at a mooring in a harbor. In addition, by equipping a power feeding device antenna circuit 1303 at a dike such as a quay in the mooring, it is possible to charge the motor boat 1301 with power loss suppressed while the motor boat 1301 is anchored. If the charging can be achieved by wireless communication, the trouble of removing a secondary battery from the motor boat 1301 for every charging can be saved.

Figure 13B:
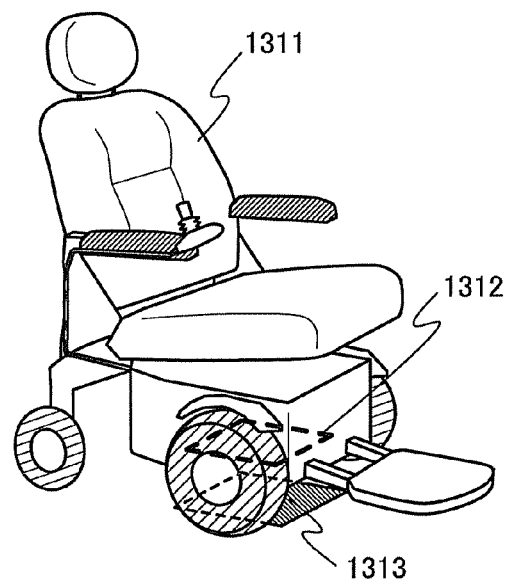

FIG. 13B shows a configuration of an electric wheelchair 1311 as one of the moving objects of the present invention. FIG. 13B illustrates the case where the electric wheelchair 1311 includes a moving object antenna circuit 1312 provided on its bottom portion. A power feeding device antenna circuit 1313 of a power feeding device for charging the electric wheelchair 1311 may be installed on a surface of a road or the like on which the electric wheelchair 1311 lies. It is possible to charge the electric wheelchair 1311 with power loss suppressed when the electric wheelchair 1311 stops. If the charging can be achieved by wireless communication, the trouble of removing a secondary battery from the electric wheelchair 1311 for every charging can be saved. In addition, since strength of a radio wave radiated to the surroundings from the power feeding device without being used for charging can be low, the possibility that a user's health would be damaged due to leaked radio waves can be reduced even when the user charges electric wheelchair 1311 while sitting on the electric wheelchair 1311.

This embodiment can be implemented in proper combination with any of the other embodiments.

Embodiment 7

In this embodiment, a configuration of a rectifier circuit used in a moving object and configurations of transistors included in various circuits of the moving object will be described.

Figure 14A:
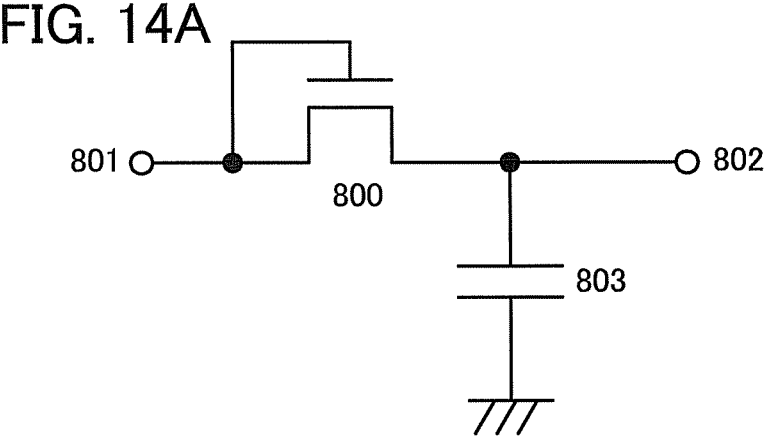
FIGS. 14A and 14B are circuit diagrams of rectifier circuits.

FIG. 14A shows an example of a half-wave rectifier circuit as one type of rectifier circuit. The rectifier circuit shown in FIG. 14A includes a transistor 800 and a capacitor 803. One of a source electrode and a drain electrode of the transistor 800 is connected to an input terminal 801, while the other is connected to an output terminal 802. A gate electrode of the transistor 800 is connected to the input terminal 801. One of a pair of electrodes of the capacitor 803 is connected to the output terminal 802, while the other is connected to the ground (GND).

Figure 14B:
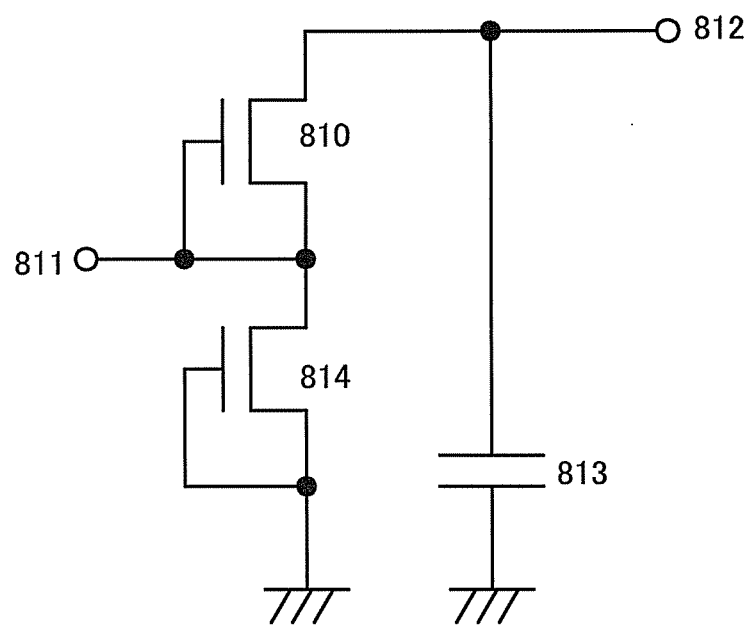

FIG. 14B shows an example of a half-wave voltage-doubler rectifier circuit as one type of rectifier circuit. The rectifier circuit shown in FIG. 14B includes a transistor 810, a transistor 814, and a capacitor 813. One of a source electrode and a drain electrode of the transistor 810 is connected to an input terminal 811, while the other is connected to an output terminal 812. A gate electrode of the transistor 810 is connected to the input terminal 811. One of a source electrode and a drain electrode of the transistor 814 is connected to the input terminal 811, while the other is connected to the ground (GND). A gate electrode of the transistor 814 is connected to the ground (GND). One of a pair of electrodes of the capacitor 813 is connected to the output terminal 812, while the other is connected to the ground (GND).

The rectifier circuit of the moving object is not limited to the configurations shown in FIGS. 14A and 14B. For example, instead of the half-wave voltage-doubler rectifier circuit, any of the other half-wave rectifier circuits such as a half-wave voltage-quadrupler rectifier circuit or a half-wave voltage-sixtupler rectifier circuit, and a full-wave rectifier circuit may be used.

In addition, although it is illustrated that separate elements are connected to each other in the circuit diagrams, in reality, one conductive film may have functions of a plurality of elements, such as a portion of a wiring functioning as an electrode. As used herein, the term "connection" includes the case where one conductive film has functions of a plurality of elements.

In addition, a source electrode and a drain electrode of a transistor may be interchangeably referred to depending on polarity of the transistor and a difference between potentials given to electrodes. In general, in an n-channel transistor, an electrode with a low potential is called a source electrode, whereas an electrode with a high potential is called a drain electrode. In a p-channel transistor, an electrode with a low potential is called a drain electrode, whereas an electrode with a high potential is called a source electrode. In this specification, although the connection relationship of the transistor is sometimes described under the assumption that a source electrode and a drain electrode are fixed for the sake of convenience, in reality, the source electrode and the drain electrode may be interchangeably referred to depending on the potential relationship.

Next, a configuration of a transistor used in a rectifier circuit, a power supply circuit, a signal processing circuit, a modulation circuit, a demodulation circuit, a selection circuit, and the like will be described. In one embodiment of the present invention, a configuration of a transistor used in any of the above-mentioned circuits is not particularly limited, but a transistor which can control a high withstanding voltage and a high current is desirably used. In addition, if a range of temperatures under environments where the moving object is used is wide, a transistor whose characteristics change very little depending on temperature is desirably used.

An example of a transistor which meets the requirement described above may include a transistor which uses, as semiconductor material, a compound semiconductor such as silicon carbide (SiC) or gallium nitride (GaN), or an oxide semiconductor formed of metal oxide such as zinc oxide (ZnO), both of which have a wider band gap than a silicon semiconductor and a lower intrinsic carrier density than silicon. Among them, the oxide semiconductor has the advantage that it can be fabricated using a sputtering method or a wet method (a printing method or the like) and has good mass productivity. While silicon carbide and gallium nitride can not have sufficient characteristics unless they are monocrystalline and process temperatures for monocrystallization of silicon carbide and gallium nitride are about 1500° C. and about 1100° C., respectively, a film forming temperature of the oxide semiconductor is low, for example, 300° C. to 500° C. (about 700° C. at a maximum) and a semiconductor element including the oxide semiconductor can be stacked on an integrated circuit including a semiconductor material such as single crystal silicon. In addition, larger substrates can be used. Accordingly, among the above-mentioned wide gap semiconductors, the oxide semiconductor has the advantage of being able to be mass produced. In addition, a crystalline oxide semiconductor having better performance (for example, field effect mobility) can be easily obtained by thermal treatment at 450° C. to 800° C.

A highly purified oxide semiconductor (OS) with reduced impurities such as moisture and hydrogen as electron donors (donors) is an i-type semiconductor (an intrinsic semiconductor) or a substantially i-type semiconductor. Thus, a transistor including the oxide semiconductor has a characteristic of very low off-state current or leak current. Specifically, the highly purified oxide semiconductor has hydrogen concentration of $5\times10^{19}/cm^3$ or less, preferably $5\times10^{18}/cm^3$ or less, more preferably $5\times10^{17}/cm^3$ or less, still more preferably $1\times10^{16}/cm^3$ or less, when measurement of the hydrogen concentration is performed using secondary ion mass spectrometry (SIMS). In addition, the carrier density of the oxide semiconductor which can be measured by Hall effect measurement is less than $1\times10^{14}/cm^3$, preferably less than $1\times10^{12}/cm^3$, more preferably less than $1\times10^{11}/cm^3$. In addition, the band gap of the oxide semiconductor is 2 eV or more, preferably 2.5 eV or more, more preferably 3 eV or more. By using a highly purified oxide semiconductor film with sufficiently reduced concentration of impurities such as moisture and hydrogen, off-state current or leak current of the transistor can be reduced.

Here, an analysis on the hydrogen concentration of the oxide semiconductor film will be mentioned. Measurements of the hydrogen concentration of the oxide semiconductor film and the hydrogen concentration of the conductive film are performed by SIMS. In principle, it is known that it is hard to obtain precise data on the vicinity of a sample surface or the vicinity of an interface with a film including a different material by SIMS. Therefore, when a distribution of hydrogen concentrations of the film in its thickness direction is analyzed by SIMS, an average value in a region in which values do not extremely vary and are substantially the same in a range where the target film exists is employed as the hydrogen concentration. In addition, if the thickness of the film is small, a region in which substantially the same values are obtained cannot be found in some cases because the film is influenced by the hydrogen concentration of an adjacent film. In this case, the maximum or minimum of the concentration of hydrogen in the region in which the film exists is employed as the hydrogen concentration of the film. In addition, if there is no mountain-like peak having a maximum value and no valley-like peak having a minimum value in the region in which the film exists, a value at an inflection point is employed as the hydrogen concentration.

Specifically, it can be proved by various experiments that a transistor including a highly purified oxide semiconductor film as an active layer has low off-state current. For example, even an element having a channel width of $1\times10^6$ µm and a channel length of 10 µM can have the characteristic of having an off-state current (a drain current in the case where a voltage between a gate electrode and a source electrode is 0 V or less) of the measurement limit or less of a semiconductor parameter analyzer, i.e., $1\times10^{-13}$ A or less, in a range of 1 V to 10 V of a voltage between the source electrode and the drain electrode (a drain voltage). In this case, it can be seen that the off-state current density corresponding to a value obtained by dividing the off-state current by the channel width of the transistor is 100 zA/µm or less. In addition, in an experiment using a circuit where a capacitor is connected to a transistor (the thickness of a gate insulating film is 100 nm) and charges flowing in or out of the capacitor are controlled by the transistor, when a highly purified oxide semiconductor film is used for a channel formation region of the transistor, a measurement of the off-state current density of the transistor from variation of charges of the capacitor per unit time is 10 zA/µm to 100 zA/µm, which is further low, in the case where the voltage between the source electrode and the drain electrode of the transistor is 3 V. Accordingly, the off-state current density of the transistor including the highly purified oxide semiconductor film as an active layer can be 100 zA/µm or less, preferably 10 zA/µm or less, more preferably 1 zA/µm or less depending on the voltage between the source electrode and the drain electrode. Accordingly, a transistor including the highly purified oxide semiconductor film as an active layer has even lower off-state current than a transistor including crystalline silicon.

A transistor including the above-described oxide semiconductor for a channel formation region is desirably used for an element required to have the characteristic of low off-state current, such as a switching element of a modulation circuit.

The off-state current of a transistor including a highly purified oxide semiconductor hardly depends on temperature. This is because the oxide semiconductor is made to be as close to intrinsic as possible by removing impurities as electron donors (donors) in the oxide semiconductor to highly purify the oxide semiconductor, so that the Fermi level is located in a center of the forbidden band. In addition, this is because an energy gap of the oxide semiconductor is 3 eV or more and there are very few thermally-excited carriers. In addition, degeneration of the source electrode and the drain electrode is also a cause of no temperature dependence. The transistor is mostly operated by carriers injected into the oxide semiconductor from the degenerated source electrode and the carrier density has no dependence on temperature; therefore, the off-state current has no dependence on temperature.

Examples of the oxide semiconductor include a quaternary metal oxide such as an In—Sn—Ga—Zn—O-based oxide semiconductor; ternary metal oxides such as an In—Ga—Zn—O-based oxide semiconductor, an In—Sn—Zn—O-based oxide semiconductor, an In—Al—Zn—O-based oxide semiconductor, an Sn—Ga—Zn—O-based oxide semiconductor, an Al—Ga—Zn—O-based oxide semiconductor, and an Sn—Al—Zn—O-based oxide semiconductor; binary metal oxides such as an In—Zn—O-based oxide semiconductor, an Sn—Zn—O-based oxide semiconductor, an Al—Zn—O-based oxide semiconductor, a Zn—Mg—O-based oxide semiconductor, an Sn—Mg—O-based oxide semiconductor, an In—Mg—O-based oxide semiconductor, and an In—Ga—O-based oxide semiconductor; an In—O-based oxide semiconductor; an Sn—O-based oxide semiconductor; and a Zn—O-based oxide semiconductor. In this specification, the term "In—Sn—Ga—Zn—O-based oxide semiconductor" means metal oxide containing Indium (In), tin (Sn), gallium (Ga), and zinc (Zn) and may have any stoichiometric composition. In addition, the oxide semiconductor may contain silicon.

The oxide semiconductor may be expressed by a chemical formula, $InMO_3(ZnO)_m$ (m>0). Here, M represents one or more metal elements selected from Ga, Al, Mn, and Co.

FIGS. 15A to 15D each show a structure of a transistor including an oxide semiconductor, which is formed over transistors including silicon. The silicon used may be either silicon included in a thin semiconductor film or silicon included in a bulk semiconductor substrate. In this embodiment, a structure in the case where a transistor including an oxide semiconductor is formed over transistors formed using a silicon-on-insulator (SOI) substrate will be described by way of an example.

Figure 15A:
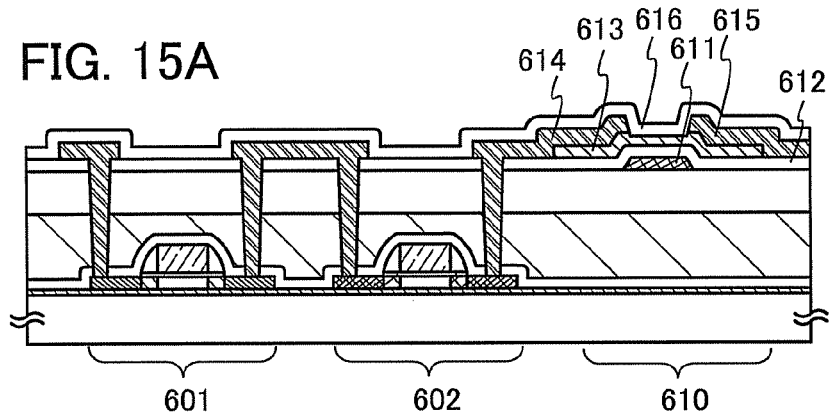
FIGS. 15A to 15D are views showing structures of transistors.

FIG. 15A shows a transistor 601 and a transistor 602 which are formed using an SOI substrate. In addition, a channel-etched bottom-gate transistor 610 including an oxide semiconductor film is formed over the transistor 601 and the transistor 602.

The transistor 610 includes a gate electrode 611, a gate insulating film 612 over the gate electrode 611, an oxide semiconductor film 613 which is over the gate insulating film 612 and overlaps with the gate electrode 611, and a source electrode 614 and a drain electrode 615 which are a pair and formed over the oxide semiconductor film 613. In addition, the transistor 610 may further include an insulating film 616 formed over the oxide semiconductor film 613 as its component. The transistor 610 has a channel-etched structure where a portion of the oxide semiconductor film 613 is exposed between the source electrode 614 and the drain electrode 615.

In addition, the transistor 610 may further include a back gate electrode over the insulating film 616. The back gate electrode is formed to overlap with a channel formation region of the oxide semiconductor film 613. The back gate electrode may be in either a floating state where the electrode is electrically isolated, or a state where the electrode is given a potential. In the latter, the back gate electrode may be given the same potential as the gate electrode 611 or a fixed potential such as a ground potential. By controlling the potential supplied to the back gate electrode, it is possible to set the threshold voltage of the transistor 610.

Figure 15B:
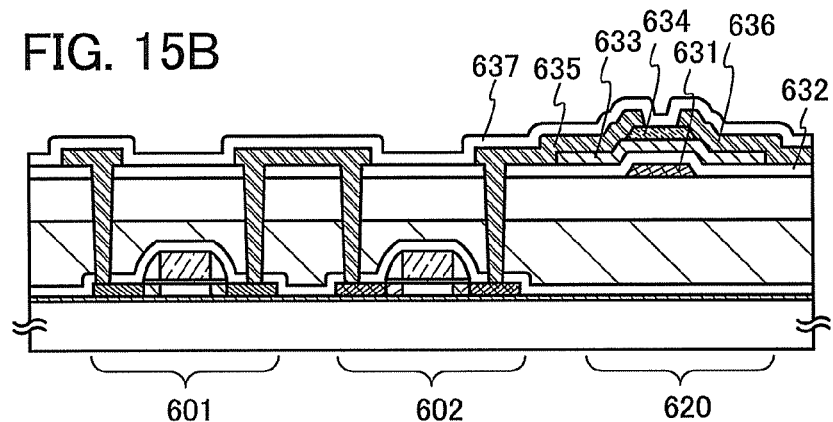

FIG. 15B shows the transistor 601 and the transistor 602 which are formed using an SOI substrate. In addition, a channel-protective bottom-gate transistor 620 including an oxide semiconductor film is formed over the transistor 601 and the transistor 602.

The transistor 620 includes a gate electrode 631, a gate insulating film 632 over the gate electrode 631, an oxide semiconductor film 633 which is over the gate insulating film 632 and overlaps with the gate electrode 631, a channel protective film 634 which is formed over the island-like oxide semiconductor film 633 at a position overlapping with the gate electrode 631, and a source electrode 635 and drain electrode 636 which are formed over the oxide semiconductor film 633. In addition, the transistor 620 may further include an insulating film 637 formed over the source electrode 635 and drain electrode 636 as its component.

The channel protective film 634 is provided to prevent damage (for example, thickness reduction due to plasma or an etchant in etching) of a portion of the oxide semiconductor film 633, which is to be a channel formation region, in a later step. This can improve reliability of the transistor.

By using an oxygen-containing inorganic material for the channel protective film 634, even if oxygen vacancy in the oxide semiconductor film 633 occurs due to heat treatment for reduction of moisture and hydrogen, oxygen can be supplied to a region of the oxide semiconductor film 633, which is in contact with at least the channel protective film 634, thereby reducing the oxygen vacancy as a donor to obtain a structure which satisfies the stoichiometric composition. Thus, the channel formation region can be made to be i-type or substantially i-type and variation of electric characteristics of the transistor due to oxygen vacancy can be reduced, which result in improvement of the electric characteristics.

In addition, the transistor 620 may further include a back gate electrode over the insulating film 637. The back gate electrode is formed to overlap with a channel formation region of the oxide semiconductor film 633. The back gate electrode may be in either a floating state where the electrode is electrically isolated, or a state where the electrode is given a potential. In the latter, the back gate electrode may be given the same potential as the gate electrode 631 or a fixed potential such as a ground potential. By controlling the potential supplied to the back gate electrode, it is possible to set the threshold voltage of the transistor 620.

Figure 15C:
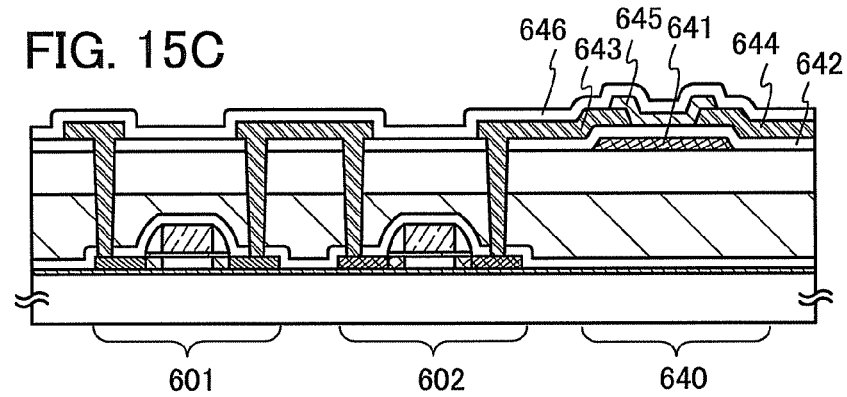

FIG. 15C shows the transistor 601 and the transistor 602 which are formed using an SOI substrate. In addition, a bottom-contact transistor 640 including an oxide semiconductor film is formed over the transistor 601 and the transistor 602.

The transistor 640 includes a gate electrode 641, a gate insulating film 642 over the gate electrode 641, a source electrode 643 and a drain electrode 644 which are over the gate insulating film 642, and an oxide semiconductor film 645 which overlaps with the gate electrode 641. In addition, the transistor 640 may further include an insulating film 646 formed on the oxide semiconductor film 645 as its component.

In addition, the transistor 640 may further include a back gate electrode over the insulating film 646. The back gate electrode is formed to overlap with a channel formation region of the oxide semiconductor film 645. The back gate electrode may be in either a floating state where the electrode is electrically isolated, or a state where the electrode is given a potential. In the latter, the back gate electrode may be given the same potential as the gate electrode 641 or a fixed potential such as a ground potential. By controlling the potential supplied to the back gate electrode, it is possible to set the threshold voltage of the transistor 640.

Figure 15D:
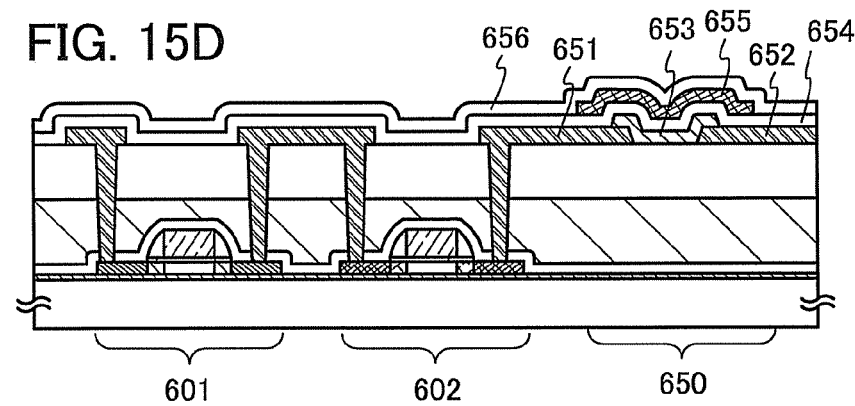

FIG. 15D shows the transistor 601 and the transistor 602 which are formed using an SOI substrate. In addition, a top-gate transistor 650 including an oxide semiconductor film is formed over the transistor 601 and the transistor 602.

The transistor 650 includes a source electrode 651 and a drain electrode 652, an oxide semiconductor film 653 which is formed over the source electrode 651 and the drain electrode 652, a gate insulating film 654 over the oxide semiconductor film 653, and a gate electrode 655 which is over the gate insulating film 654 and overlaps with the oxide semiconductor film 653. In addition, the transistor 650 may further include an insulating film 656 formed on the gate electrode 655 as its component.

Although all of the above-described transistors have single-gate structures in the drawings, they may have multi-gate structures including a plurality of electrically connected gate electrodes, that is, a plurality of channel formation regions.

This embodiment may be practiced in combination with other embodiments described above.

This application is based on Japanese Patent Application serial no. 2010-023706 filed with Japan Patent Office on Feb. 5, 2010, the entire contents of which are hereby incorporated by reference.

What is claimed is:

1. A moving object comprising:
an antenna circuit configured to generate a first electric signal and a second electric signal from a first radio wave and a second radio wave sequentially transmitted from a power feeding device, respectively;
a signal processing circuit configured to extract data on a positional relationship between the antenna circuit and the power feeding device, using the first electric signal;
a secondary battery configured to store electric energy using the second electric signal;
an electric motor configured to receive the electric energy from the secondary battery;
an oscillator circuit configured to generate a signal having a certain frequency; and
a modulation circuit configured to apply a voltage to the antenna circuit in accordance with a start signal and the signal having the certain frequency,
wherein the start signal is generated in the signal processing circuit.

2. The moving object according to claim 1,
wherein the antenna circuit comprises an antenna including a conductor that has a spiral shape, and a capacitor.

3. The moving object according to claim 1,
wherein the antenna circuit is configured to transmit a third radio wave which is generated in accordance with the start signal, to the power feeding device.

4. The moving object according to claim 1, further comprising an output device configured to output the extracted data.

5. The moving object according to claim 1,
wherein the moving object is one selected from the group consisting of automobiles, motorized bicycles, aircrafts, boats, and railroad cars.

6. A moving object comprising:
an antenna circuit configured to generate a first electric signal and a second electric signal from a first radio wave and a second radio wave sequentially transmitted from a power feeding device, respectively;
a signal processing circuit configured to extract data on a positional relationship between the antenna circuit and the power feeding device, using the first electric signal, the signal processing circuit being configured to generate a third electric signal for instructing the power feeding device to transmit the second radio wave, in accordance with the data;
a secondary battery configured to store electric energy using the second electric signal; and
an electric motor configured to receive the electric energy from the secondary battery, wherein the antenna circuit is configured to generate a third radio wave from the third electric signal.

7. The moving object according to claim 6, wherein the antenna circuit comprises an antenna including a conductor that has a spiral shape, and a capacitor.

8. The moving object according to claim 6, further comprising:
an oscillator circuit configured to generate a signal having a certain frequency; and
a modulation circuit configured to apply a voltage to the antenna circuit in accordance with a start signal and the signal having the certain frequency,
wherein the start signal is generated in the signal processing circuit.

9. The moving object according to claim 6,
wherein the antenna circuit is configured to transmit a fourth radio wave which is generated in accordance with a start signal, to the power feeding device.

10. The moving object according to claim 6, further comprising an output device configured to output the extracted data.

11. The moving object according to claim 6,
wherein the moving object is one selected from the group consisting of automobiles, motorized bicycles, aircrafts, boats, and railroad cars.

12. A wireless power feeding system comprising:
a power feeding device including a first antenna circuit; and
a moving object,
wherein the moving object includes:
a second antenna circuit configured to generate a first electric signal and a second electric signal from a first radio wave and a second radio wave sequentially transmitted from the first antenna circuit, respectively;
a signal processing circuit configured to extract data on a positional relationship between the first antenna circuit and the second antenna circuit, using the first electric signal;
a secondary battery configured to store electric energy using the second electric signal;
an electric motor configured to receive the electric energy from the secondary battery,
an oscillator circuit configured to generate a signal having a certain frequency; and
a modulation circuit configured to apply a voltage to the second antenna circuit in accordance with a start signal and the signal having the certain frequency, and
wherein the start signal is generated in the signal processing circuit.

13. The wireless power feeding system according to claim 12,
wherein the first antenna circuit or the second antenna circuit comprises an antenna including a conductor that has a spiral shape, and a capacitor.

14. A wireless power feeding system comprising:
a power feeding device including a first antenna circuit; and
a moving object,
wherein the moving object includes:
a second antenna circuit configured to generate a first electric signal and a second electric signal from a first radio wave and a second radio wave sequentially transmitted from the first antenna circuit, respectively;
a signal processing circuit configured to extract data on a positional relationship between the first antenna circuit and the second antenna circuit using the first electric signal, the signal processing circuit being configured to generate a third electric signal for instructing the power feeding device to transmit the second radio wave, in accordance with the data;
a secondary battery configured to store electric energy using the second electric signal; and
an electric motor configured to receive the electric energy from the secondary battery, and
wherein the second antenna circuit is configured to generate a third radio wave from the third electric signal.

15. The wireless power feeding system according to claim 14,
wherein the first antenna circuit or the second antenna circuit includes an antenna including a conductor that has a spiral shape, and a capacitor.

16. A wireless power feeding method comprising:
converting a first radio wave transmitted from a power feeding device into an electric signal in a moving object;
extracting data on a positional relationship between an antenna circuit of the power feeding device and an antenna circuit of the moving object, from the electric signal;
transmitting a second radio wave from the power feeding device after modifying the positional relationship based on the data;
charging a secondary battery of the moving object using the second radio wave;
generating a start signal in a signal processing circuit of the moving object;
generating a signal having a certain frequency in an oscillator circuit in the moving object; and
applying a voltage to the antenna circuit of the moving object in accordance with the start signal and the signal having the certain frequency in a modulation circuit.

17. The wireless power feeding method according to claim 16, further comprising a step of:
transmitting a third radio wave which is generated in accordance with the start signal, to the power feeding device by the antenna circuit.

18. The wireless power feeding method according to claim 16, further comprising a step of outputting the extracted data by an output device in the moving object.

19. The wireless power feeding method according to claim 16,
wherein the moving object is one selected from the group consisting of automobiles, motorized bicycles, aircrafts, boats, and railroad cars.

20. A wireless power feeding method comprising:
converting a first radio wave transmitted from a power feeding device into an electric signal in a moving object;
extracting data on a positional relationship between an antenna circuit of the power feeding device and an antenna circuit of the moving object, from the electric signal;
transmitting a second radio wave from the power feeding device after modifying the positional relationship by changing position or direction of the moving object based on the data;

charging a secondary battery of the moving object using the second radio wave;
generating a start signal in a signal processing circuit of the moving object;
generating a signal having a certain frequency in an oscillator circuit in the moving object; and
applying a voltage to the antenna circuit of the moving object in accordance with the start signal and the signal having the certain frequency in a modulation circuit.

21. The wireless power feeding method according to claim 20, further comprising a step of:
transmitting a third radio wave which is generated in accordance with the start signal, to the power feeding device by the antenna circuit of the moving object.

22. The wireless power feeding method according to claim 20, further comprising a step of outputting the extracted data by an output device in the moving object.

23. The wireless power feeding method according to claim 20,
wherein the moving object is one selected from the group consisting of automobiles, motorized bicycles, aircrafts, boats, and railroad cars.

24. A wireless power feeding method comprising:
converting a first radio wave transmitted from a power feeding device into an electric signal in a moving object;
extracting data on a positional relationship between an antenna circuit of the power feeding device and an antenna circuit of the moving object, from the electric signal;
transmitting a second radio wave from the power feeding device after modifying the positional relationship by changing position or direction of the power feeding device based on the data;
charging a secondary battery of the moving object using the second radio wave;
generating a start signal in a signal processing circuit of the moving object;
generating a signal having a certain frequency in an oscillator circuit in the moving object; and
applying a voltage to the antenna circuit of the moving object in accordance with the start signal and the signal having the certain frequency in a modulation circuit.

25. The wireless power feeding method according to claim 24, further comprising a step of:
transmitting a third radio wave which is generated in accordance with the start signal, to the power feeding device by the antenna circuit of the moving object.

26. The wireless power feeding method according to claim 24, further comprising a step of outputting the extracted data by an output device in the moving object.

27. The wireless power feeding method according to claim 24,
wherein the moving object is one selected from the group consisting of automobiles, motorized bicycles, aircrafts, boats, and railroad cars.

* * * * *